US00RE45087E

(19) United States
(12) Reissued Patent
Little et al.

(10) Patent Number: US RE45,087 E
(45) Date of Reissued Patent: Aug. 19, 2014

(54) CERTIFICATE MANAGEMENT AND TRANSFER SYSTEM AND METHOD

(71) Applicant: Research in Motion Limited, Waterloo (CA)

(72) Inventors: Herbert Anthony Little, Waterloo (CA); Neil Patrick Adams, Waterloo (CA); David Francis Tapuska, Waterloo (CA); Michael Stephen Brown, Kitchener (CA); Michael Grant Kirkup, Waterloo (CA); James Andrew Godfrey, Waterloo (CA)

(73) Assignee: BlackBerry Limited, Waterloo, Ontario (CA)

(21) Appl. No.: 13/964,180

(22) Filed: Aug. 12, 2013

Related U.S. Patent Documents

Reissue of:
(64) Patent No.: 8,015,400
Issued: Sep. 6, 2011
Appl. No.: 12/480,841
Filed: Jun. 9, 2009

U.S. Applications:
(63) Continuation of application No. 10/480,615, filed as application No. PCT/CA02/00868 on Jun. 12, 2002, now Pat. No. 7,564,453.

(60) Provisional application No. 60/365,533, filed on Mar. 20, 2002, provisional application No. 60/297,681, filed on Jun. 12, 2001.

(51) Int. Cl.

| | |
|---|---|
| ***H04L 29/06*** | (2006.01) |
| *G06F 11/30* | (2006.01) |
| *G06F 12/14* | (2006.01) |
| *G06F 17/30* | (2006.01) |
| *G06F 15/16* | (2006.01) |
| *G06F 15/177* | (2006.01) |
| *G06K 9/00* | (2006.01) |

(52) U.S. Cl.
USPC ..... 713/156; 713/157; 713/158; 713/170; 709/217; 709/221; 726/2; 726/27

(58) Field of Classification Search
None
See application file for complete search history.

(56) References Cited

U.S. PATENT DOCUMENTS

| | | | |
|---|---|---|---|
| 4,028,500 | A | 6/1977 | McClure et al. |
| 5,410,602 | A | 4/1995 | Finkelstein et al. |

(Continued)

FOREIGN PATENT DOCUMENTS

| | | | |
|---|---|---|---|
| CA | 2371329 | A | 11/2000 |
| CA | 2476914 | | 2/2006 |

(Continued)

OTHER PUBLICATIONS

Official Action (Inquiry), Japanese Application No. 2003-504272 dated Mar. 13, 2009.

(Continued)

*Primary Examiner* — Shin-Hon Chen
(74) *Attorney, Agent, or Firm* — Bereskin & Parr LLP/S.E.N.C.R.L., s.r.l.

(57) ABSTRACT

A method and system for Certificate management and transfer between messaging clients are disclosed. When communications are established between a first messaging client and a second messaging client, one or more Certificates stored on the first messaging client may be selected and transferred to the second messaging client. Messaging clients may thereby share Certificates. Certificate management functions such as Certificate deletions, Certificate updates and Certificate status checks may also be provided.

30 Claims, 8 Drawing Sheets

(56) References Cited

U.S. PATENT DOCUMENTS

| | | | |
|---|---|---|---|
| 5,457,748 | A | 10/1995 | Bergum et al. |
| 5,623,546 | A | 4/1997 | Hardy et al. |
| 5,666,530 | A | 9/1997 | Clark et al. |
| 5,710,922 | A | 1/1998 | Alley |
| 5,727,202 | A | 3/1998 | Kucala |
| 5,778,068 | A | 7/1998 | Johnson et al. |
| 5,778,346 | A | 7/1998 | Frid-Nielsen et al. |
| 5,812,671 | A | 9/1998 | Ross |
| 5,870,030 | A | 2/1999 | DeLuca et al. |
| 5,956,707 | A | 9/1999 | Chu |
| 5,991,399 | A | 11/1999 | Graunke et al. |
| 6,000,000 | A | 12/1999 | Hawkins |
| 6,061,448 | A | 5/2000 | Smith et al. |
| 6,073,237 | A | 6/2000 | Ellison |
| 6,081,601 | A | 6/2000 | Raivisto |
| 6,084,969 | A | 7/2000 | Brook |
| 6,085,323 | A | 7/2000 | Shimizu et al. |
| 6,108,788 | A | 8/2000 | Moses et al. |
| 6,119,228 | A | 9/2000 | Angelo et al. |
| 6,125,369 | A | 9/2000 | Wu |
| 6,209,098 | B1 | 3/2001 | Davis |
| 6,219,694 | B1 | 4/2001 | Lazaridis |
| 6,229,894 | B1 | 5/2001 | Van Oorschot et al. |
| 6,230,186 | B1 | 5/2001 | Yaker |
| 6,231,985 | B1 | 5/2001 | Chen et al. |
| 6,266,420 | B1 | 7/2001 | Langford et al. |
| 6,266,775 | B1 | 7/2001 | Kamba |
| 6,289,105 | B1 | 9/2001 | Murota |
| 6,301,658 | B1 | 10/2001 | Koehler |
| 6,313,732 | B1 | 11/2001 | DeLuca et al. |
| 6,314,190 | B1 | 11/2001 | Zimmermann |
| 6,348,972 | B1 | 2/2002 | Taniguchi et al. |
| 6,389,455 | B1 | 5/2002 | Fuisz |
| 6,463,463 | B1 | 10/2002 | Godfrey |
| 6,531,985 | B1 | 3/2003 | Jones |
| 6,564,320 | B1 | 5/2003 | de Silva et al. |
| 6,661,927 | B1 | 12/2003 | Suarez et al. |
| 6,697,942 | B1 | 2/2004 | L'Heureux et al. |
| 6,725,262 | B1 | 4/2004 | Choquier et al. |
| 6,732,144 | B1 | 5/2004 | Kizu et al. |
| 6,745,024 | B1 | 6/2004 | DeJaco et al. |
| 6,779,115 | B1 | 8/2004 | Naim |
| 6,819,766 | B1 | 11/2004 | Weidong |
| 6,829,357 | B1 | 12/2004 | Alrabady et al. |
| 6,904,521 | B1 | 6/2005 | Jivsov |
| 6,918,038 | B1 | 7/2005 | Smith et al. |
| 6,925,568 | B1 | 8/2005 | Heinonen |
| 6,931,532 | B1 | 8/2005 | Davis et al. |
| 6,983,367 | B2 | 1/2006 | Go et al. |
| 6,993,137 | B2 | 1/2006 | Fransdonk |
| 6,996,720 | B1 | 2/2006 | DeMello et al. |
| 7,003,667 | B1 | 2/2006 | Slick et al. |
| 7,020,708 | B2 | 3/2006 | Nelson et al. |
| 7,032,240 | B1 | 4/2006 | Cronce et al. |
| 7,113,927 | B1 | 9/2006 | Tanaka et al. |
| 7,127,604 | B2 | 10/2006 | Lide et al. |
| 7,171,552 | B1 | 1/2007 | Bell |
| 7,228,418 | B1 | 6/2007 | Girault |
| 7,254,712 | B2 | 8/2007 | Godfrey et al. |
| 7,299,502 | B2 | 11/2007 | Schmeling et al. |
| 7,529,374 | B2 | 5/2009 | Huttunen |
| 7,546,453 | B2 | 6/2009 | Little et al. |
| 7,653,815 | B2 | 1/2010 | Godfrey et al. |
| 7,657,736 | B2 | 2/2010 | Godfrey et al. |
| 7,827,406 | B2 | 11/2010 | Brown et al. |
| 7,953,971 | B2 | 5/2011 | Brown et al. |
| 8,015,400 | B2 | 9/2011 | Little et al. |
| 2001/0011308 | A1 | 8/2001 | Clark et al. |
| 2001/0046307 | A1 | 11/2001 | Wong |
| 2001/0050990 | A1 | 12/2001 | Sudia |
| 2002/0007453 | A1 | 1/2002 | Nemovicher |
| 2002/0032861 | A1 | 3/2002 | Azuma |
| 2002/0035685 | A1 | 3/2002 | Ono et al. |
| 2002/0035687 | A1 | 3/2002 | Skantze |
| 2002/0038420 | A1 | 3/2002 | Collins et al. |
| 2002/0051544 | A1 | 5/2002 | Kikuchi et al. |
| 2002/0053023 | A1 | 5/2002 | Patterson et al. |
| 2002/0053032 | A1 | 5/2002 | Dowling et al. |
| 2002/0059375 | A1 | 5/2002 | Pivowar et al. |
| 2002/0059383 | A1 | 5/2002 | Katsuda |
| 2002/0080752 | A1 | 6/2002 | Johansson et al. |
| 2002/0099766 | A1 | 7/2002 | Tuli |
| 2002/0147905 | A1 | 10/2002 | Perlman |
| 2002/0165967 | A1 | 11/2002 | Morgan |
| 2002/0169954 | A1 | 11/2002 | Bandini et al. |
| 2002/0173295 | A1 | 11/2002 | Nykanen et al. |
| 2002/0176067 | A1 | 11/2002 | Charbon |
| 2003/0002671 | A1 | 1/2003 | Inchalik et al. |
| 2003/0074555 | A1 | 4/2003 | Fahn et al. |
| 2003/0126085 | A1 | 7/2003 | Srinivasan |
| 2003/0172122 | A1 | 9/2003 | Little et al. |
| 2003/0198350 | A1 | 10/2003 | Foster et al. |
| 2003/0212888 | A1 | 11/2003 | Wildish et al. |
| 2004/0083364 | A1 | 4/2004 | Andreaux et al. |
| 2004/0093493 | A1 | 5/2004 | Bisbee et al. |
| 2004/0133520 | A1 | 7/2004 | Callas et al. |
| 2004/0133775 | A1 | 7/2004 | Callas et al. |
| 2004/0171369 | A1 | 9/2004 | Little |
| 2004/0196978 | A1 | 10/2004 | Godfrey et al. |
| 2004/0202327 | A1 | 10/2004 | Little |
| 2004/0205248 | A1 | 10/2004 | Little et al. |
| 2005/0005097 | A1 | 1/2005 | Murakawa |
| 2005/0039100 | A1 | 2/2005 | Bade et al. |
| 2005/0114671 | A1 | 5/2005 | Little et al. |
| 2005/0148323 | A1 | 7/2005 | Little et al. |
| 2005/0149442 | A1 | 7/2005 | Adams et al. |
| 2005/0163320 | A1 | 7/2005 | Brown et al. |
| 2005/0188219 | A1 | 8/2005 | Annicet et al. |
| 2005/0203855 | A1 | 9/2005 | Malcolm |
| 2005/0210289 | A1 | 9/2005 | Brown |
| 2005/0222991 | A1 | 10/2005 | Ikenoya |
| 2005/0246763 | A1 | 11/2005 | Corcoran et al. |
| 2006/0015722 | A1 | 1/2006 | Rowan et al. |
| 2006/0036848 | A1 | 2/2006 | Brown et al. |
| 2006/0036849 | A1 | 2/2006 | Brown et al. |
| 2006/0036865 | A1 | 2/2006 | Brown et al. |
| 2006/0059332 | A1 | 3/2006 | Adams et al. |
| 2007/0083749 | A1 | 4/2007 | Fang |
| 2007/0118874 | A1 | 5/2007 | Adams et al. |
| 2007/0123307 | A1 | 5/2007 | Adams et al. |
| 2007/0165844 | A1 | 7/2007 | Little et al. |
| 2008/0016359 | A1 | 1/2008 | Godfrey et al. |
| 2009/0292916 | A1 | 11/2009 | Little et al. |
| 2010/0115264 | A1 | 5/2010 | Godfrey et al. |
| 2010/0122089 | A1 | 5/2010 | Godfrey et al. |
| 2010/0124333 | A1 | 5/2010 | Godfrey et al. |

FOREIGN PATENT DOCUMENTS

| | | |
|---|---|---|
| CA | 2371329 | 10/2010 |
| EP | 0500222 | 8/1992 |
| EP | 0500245 | 8/1992 |
| EP | 0841770 | 5/1998 |
| EP | 0942568 | 9/1999 |
| EP | 1096725 | 5/2001 |
| EP | 1096727 | 5/2001 |
| EP | 1580953 | 9/2005 |
| EP | 1806683 | 7/2007 |
| GB | 2328125 | 2/1999 |
| JP | 06-276221 | 9/1994 |
| JP | 07-162407 | 6/1995 |
| JP | 7-509333 | 10/1995 |
| JP | 07-509333 | 10/1995 |
| JP | 8-251221 | 9/1996 |
| JP | 09-046330 | 2/1997 |
| JP | 10-22992 | 1/1998 |
| JP | 10-107832 | 4/1998 |
| JP | 2000-10477 | 6/1998 |
| JP | 11-272581 | 10/1999 |
| JP | 11-272582 | 10/1999 |
| JP | 2000-49766 | 2/2000 |
| JP | 2001-103571 | 4/2001 |
| JP | 2001-147849 | 5/2001 |
| JP | 2001-197055 | 7/2001 |

(56) References Cited

FOREIGN PATENT DOCUMENTS

| | | |
|---|---|---|
| JP | 2002-535884 | 10/2002 |
| JP | 2004-048139 | 2/2004 |
| JP | 2001-147849 | 5/2011 |
| KR | 1020030059303 | 7/2003 |
| WO | 94/12938 | 6/1994 |
| WO | 94/19238 | 6/1994 |
| WO | 96/36934 | 11/1996 |
| WO | 97/41661 | 11/1997 |
| WO | 98/34374 | 8/1998 |
| WO | 99/05814 | 2/1999 |
| WO | 99/06900 | 2/1999 |
| WO | WO 99/05814 | 2/1999 |
| WO | WO 99/06900 | 2/1999 |
| WO | 99/17564 | 4/1999 |
| WO | 99/27678 | 6/1999 |
| WO | 99/63709 | 12/1999 |
| WO | 99/64946 | 12/1999 |
| WO | 00/31931 | 2/2000 |
| WO | 00/31931 | 6/2000 |
| WO | 00/69114 | 11/2000 |
| WO | 00/72506 | 11/2000 |
| WO | 01/01644 | 1/2001 |
| WO | 01/16933 | 3/2001 |
| WO | 01/24434 | 4/2001 |
| WO | 01/41353 | 6/2001 |
| WO | 01/63386 | 8/2001 |
| WO | 01/71608 | 9/2001 |
| WO | 01/78491 | 10/2001 |
| WO | 02/101580 | 12/2002 |
| WO | 02/101605 | 12/2002 |
| WO | 02/102009 | 12/2002 |
| WO | 03/005636 | 1/2003 |
| WO | 03/007570 | 1/2003 |
| WO | 03/009561 | 1/2003 |
| WO | WO 03/005636 | 1/2003 |
| WO | 03/015367 | 2/2003 |
| WO | 03/075530 | 9/2003 |
| WO | 03/079627 | 9/2003 |
| WO | 03/079628 | 9/2003 |

OTHER PUBLICATIONS

Rejection of Appeal, Japanese Application No. 2003-504272, dated Dec. 7, 2009.
Office Action for Japanese Application No. 2003-504272, dated May 28, 2010.
Office Action for Japanese Application No. 2007-61073, dated May 28, 2010.
Final Office Action for Japanese Application No. 2007-61073, dated Mar. 3, 2011.
First Office Action, Chinese Application No. 02815382.0, Feb. 24, 2006.
Second Office Action, Chinese Application No. 02815382.0, dated Aug. 25, 2006.
Third Office Action, Chinese Application No. 02815382.0, dated Jan. 26, 2007.
Fourth Office Action, Chinese Application No. 02815382.0, dated Jun. 29, 2007.
Notice of Allowance (Notification for the Grant of Invention), Chinese Application No. 02815382.0, dated May 16, 2008.
Certificate of Grant of Patent, dated Dec. 30, 2005, Singapore Application No. 200307398.8.
First Examination Report, Indian Application No. 2173/DELNP/2003, dated Apr. 27, 2004.
Intimation of Grant, Indian Application No. 2173/DELNP/2003 dated Mar. 27, 2008.
Office Action, Korean Application No. 2003-7016487, dated Nov. 1, 2005.
Final Office Action, Korean Application No. 2003-7016487, dated May 26, 2006.
Refusal of Amendment for Reconsideration Issued and Final Rejection Maintained, Korean Application No. 2003-7016487, dated Oct. 10, 2006.
Decision from Intellectual Property Tribunal, Korean Application No. 2003-7016487, dated Oct. 31, 2007.
EPO Communication Pursuant to Article 96(2) EPC, in connection with Application No. 02737687.0-2201, dated Oct. 15, 2007.
Decision from Patent Court, Korean Application No. 2003-7016487, dated Nov. 21, 2008.
Notice of Abandonment dated Aug. 7, 2012, Canadian Patent Application No. 2,717,229.
EPO Communication Pursuant to Article 96(2) EPC, in connection with Application No. 02737687.0-2201, dated Apr. 21, 2004.
Response to Official Communication of Apr. 21, 2004, in connection with Application No. 02737687.0-2201, dated Sep. 1, 2004.
EPO Communication Pursuant to Article 96(2) EPC, in connection with Application No. 02737687.0-2201, dated Setpember 19, 2006.
Response to Official Communication of Sep. 19, 2006, in connection with Application No. 02737687.0-2201, dated Jan. 26, 2007.
Response to Official Communication of Oct. 15, 2007, in connection with Application No. 02737687.0-2201, dated Apr. 24, 2008.
Summons to Attend Oral Proceedings Pursuant to Rule 115(1) EPC, in connection with Application No. 02737687.0-2201, dated May 18, 2010.
Written submission in response to Summons, dated Jul. 26, 2010, European Application No. 02737687.0.
Brief Communication, in connection with Application No. 02737687.0-2201, dated Aug. 20, 2010.
Minutes of the oral proceedings before the Examining Division, in connection with Application No. 02737687.0-2201, dated Sep. 7, 2010.
Decision to refuse a European Patent application, in connection with Application No. 02737687.0-2201, dated Sep. 7, 2010.
Office Action, Canadian Application No. 2450584, dated Mar. 14, 2006.
Office Action, Canadian Application No. 2450584, dated Feb. 3, 2009.
Notice of Allowance, Canadian Application No. 2450584, dated Apr. 16, 2010.
Office Action from CIPO issued on Feb. 2, 2011, Canadian Application No. 2,717,229.
International Preliminary Examination Report for PCT/CA02/00868 dated Jul. 3, 2003.
International Search Report for PCT/CA02/00868 mailed Oct. 2, 2002.
Written Opinion issued on Jan. 21, 2003 by European Patent Office for PCT/CA02/00868.
Notice of Allowance dated May 21, 2013, U.S. Appl. No. 13/223,999.
Office Action dated Aug. 28, 2012, U.S. Appl. No. 13/223,999.
Response dated Nov. 28, 2012, U.S. Appl. No. 13/223,999.
Final office Action dated Mar. 7, 2013, U.S. Appl. No. 13/223,999.
Response dated May 2, 2013, U.S. Appl. No. 13/223,999.
Berson T et al.: "Cryptography as a network serivce" 8th Annual Symposium on Network and Distributed System Security. (NDSS' 01) Internet Soc Reston, VA, USA, Feb. 7, 2001-Feb. 9, 2001 pp. 1-12, XP002551706.
Blom et al. "Conversational IP Multimedia Security", 4th International Workshop on Mobile and Wireless Communications Network, Sep. 9-11, 2002, pp. 147-151.
Brown I., et al.: "A Proxy Approach to E-Mail Security", Software Practice & Experience, John Wiley & Sons Ltd. Chichester, GB, vol. 29, No. 12, Oct. 1999, pp. 1049-1060, XP00852351.
Brown M., et al.: "PGP in Constrained Wireless Devices", Proceedings of the 9th Usenix Security Symposium, Denver, CO, Aug. 14-17, 2000, XP002210575.
Butrico M. et al.: "Enterprise data access from mobile computers: an end-to-end story" Research Issues in Data Engineering, 2000. Ride 2000. Proceedings. Tenth International Workshop on San Diego, CA, USA Feb. 28-29, 2000, Los Alamitos, CA, USA, IEEE Comput. Soc. US, Feb. 28, 2000, pp. 9-16, XP010377083.

(56) References Cited

OTHER PUBLICATIONS

Chadwick, D.W., et al., "Modifying LDAP to Support X.509-based PKIs", In Seventeenth Annual IFIP WG 11.3 Working Conference on Database and Applications Security at Estes Park, Colorado, Aug. 2003.
Cole R., et al: "An Architecture for a Mobile OSI Mail Access System", IEEE Journal on Selected Areas in Communications, IEEE Inc., New York, US, vol. 7, No. 2, Feb. 1989, pp. 249-256, XP000904914.
Crocker S. et al. "MIME Object Security Services: rfc1848.text". IETF Standard, Internet Engineering Task Force, IETF, CH, Oct. 1995, XP015007633.
Deroest J.: "Ubiquitous Mobile Computing" Sunexpert Magazine, 'Online! Jul. 1998, pp. 54-56, SP002213003 Retrieved from the Internet: <URL:http://swexpert.com/C8/SE.C8.JUL.98.pdf> 'retrieved on Sep. 10, 2002.
Dusse et al., "S/MIME Version 2 Message Specification," The Internet Society, Mar. 1998, pp. 1-37.
Dusse et al.: "S/MIME Version 2 Certificate Handling," Database IETF RFC Online IETF: RFC 2312, Mar. 1998, pp. 1-20 (Chapter 2.1, Chapter 4.1), XP002220385.
Encrypt Pre-shared Keys in Cisco IOS Router Configuration Example, Document 1D 46420 Cisco Systems, Internet Address: htto:/lwww.cisco.com/en/US/tech/tk5S3/tk3721technologies_configuration_example09186a00801f2336.shtml.
Eskicioglu et al. "A Key Transport Protocol Based on Secret Sharing Applications to Information Security", IEEE Transactions on Consumer Electronics, vol. 46, No. 4, Nov. 2002, pp. 816-824.
Fumy et al. Principles of Key Management, IEEE Journal on Selected Areas in Communications, VDI, 11, No. 5, Jun. 1999, pp. 785-793.
Gong et al.: "Multicast Security and its Extension to a Mobile Environment," SRI International, Computer Science Laboratory, J.C. Baltzer AG, Science Publishers, Wireless Networks I (1995) pp. 281-295.
Hämetvaara, Vesa. "Modifying LDAP to Support X.509-based PKIs", In Seventeenth Annual IFIP WG 11.3 Working Conference on Database and Applications Security at Estes Park, Colorado, Aug. 2003.
Harris A.: "Content Privacy and Content Security Working Together", Internet Article. Content Technologies White Paper, Online! Sep. 1999, XP002223158, pp. 8-9.
Hoffman: "Enhanced Services for S/MIME," Database IETF RFC Online IETF;RFC 2634, Jun. 1999, pp. 1-58 (Chapter 3, pp. 24-32), XP002220386.
Notice of Reason for Rejection for Japanese Application No. 2003-504272, dated May 12, 2006 (mailed May 16, 2006).
Housley, R. et al. "Internet X.509 Public Key Infrastructure Certificate and CRL Profile (RFC 2459)", Jan. 1999.
ITU-T, "Information technology—Open systems interconnection—The Directory: Public-key and attribute certificate frameworks", Mar. 2000.
Jin Jing et al.: "Client-server computing in mobile environments" ACM Computing Surveys, Jun. 1999, ACM, USA, vol. 31, No. 2, pp. 117-157, XP002212945.
Katsuro Inaya, et al., "Use Windows CE Now", ASCII, Oct. 1, 1999, vol. 23, No. 10, pp. 266-285.
Kiely, Don, Sal Server 2005 Secures Your Data Like Never Before, Sep. 29, 2005. Internet Address: http://www.devx.comlcodemaglArticle/29351?trk=DXESS_DB.
Kotzanikoloau et al. "Hybrid Key Establishment for Multiphase Self-Organized Sensor Networks", 6" IEEE International Symposium on a World of Wireless Mobile and Multimedia Networks, Jun. 13-16, 2005, pp. 581-587.
Lai, M.K.E., et al.: "A Mobile Subscriber Proxy Preserving Writer-to-Reader Message Security", Military Communications Conference, 1996, Milcom '96, Conference Proceedings, IEEE McLean, VA, USA Oct. 21-24, 1996, New York, NY, USA, IEEE, US, Oct. 21, 1996, pp. 461-467, XP010203896 (XP00090914).
Levien: "Protecting Internet E-Mail From Prying Eyes," Data Communications, McGraw Hill, New York, US, vol. 25, No. 6 (May 1, 1996), pp. 117-118, 120, 122, XP 000587586.
Mambo M. et al.: "Proxy Signatures: Delegation of the Power to Sign Messages" IEICE Transactions on Fundamentals of Electronics, Communications and Computer Sciences, IECE Tokyo, JP, vol. E79-A, No. 9, Sep. 1, 1996, pp. 1338-1353, XP000679624.
Myers, M. et al. "Certificate Management Messages over CMS (RFC 2797)", Apr. 2000.
Myers, M. et al., X.509 Internet Public Key Infrastructure Online Certificate Status Protocol—OCSP, RFC2560 (Jun. 1999).
Nakajima et al.: "Adaptive continuous media applications in mobile computing environments" Multimedia Computing Systems '97. Proceedings., IEEE International Conference on Ottawa, Ont., Canada Jun. 3-6, 1997, Los Alamitos, CA, USA, IEEE Comput. Soc. US, Jun. 3, 1997, pp. 152-160, XP010239184.
Policht, Martin, Sal Server 2005 Security—Part 3 Encryption, Database Journal Internet Address: http//www.databasejournal.com/features/mssql/article.php/34S3931.
Ramsdell, D. et al. "Secure/Multi-purpose Internet Mail Extensions (S/MIME) Version 3.1 Certificate Handling (RFC 3850)", Jul. 2004.
Fesearch in Motion Limited, Blackberry Security White Paper Release 4.0 2005 Internet Address: http://blackberry.comlknowledgecenterpubliclivelink.exe?func=ll&objld=S2S044 &objAction=browse&sort=name.
Research in Motion Limited, Blackberry Security with theS/MIME Support Package, version 1.5, Dec. 17, 2003.
Russell S: "Fast checking of individual certificate revocation on small systems" Computer Security Applications Conference, 1999. (ACSAC '99). Proceedings. 15th Annual Phoenix, AZ, USA Dec. 6-10, 1999, Los Alamitos, CA, USA, IEEE Comput. Soc. US. Dec. 6, 1999, pp. 249-255, XP010368617.
Sawano Hiroyuki, "Create a secure electronic mail environment with S/MIME", @IT Security & Trust, May 30, 2001, URL: http://www.atmarkit.co.jp/fsecurity/special/04smime/smime01.html.
Stale Schumacher: "AutoPGP FAQ, Version 1," Internet Newsgroup, 'Online (Apr. 19, 1994), XP002230742.
Stallings, W.: "S/MIME: E-Mail Gets Secure". Byte, McGraw-Hill Inc., St. Peterborough, US, vol. 23, No. 7, Jul. 1998, pp. 41-42, XO000774260.
Subramanyam V., et al.: "Security in mobile systems", Reliable Distributed Systems, 1998 Proceedings. 17th IEEE Symposium on W. Lafayette, IN, USA, Oct. 20-23, 1998, Los Alamitos, CA, USA IEEE Comput. Soc., US. Oct. 20, 1998, pp. 407-412, XP010319125.
Syverson: "Limitations on Design Principles for Public Key Protocols," Security and Privacy, 1996, Proceedings, 1996 IEEE Symposium on Oakland, CA, USA, May 6-8, 1996, Los Alamitos, CA, USA, IEEE Comput. Soc., US, May 6, 1996, pp. 62-72, XP010164926.
Torvinen V.: "Wireless PKI: Fundamentals", Internet Article, Radicchio White Paper, 'Online! 2000, XP002223159, pp. 1-15.
Wasley D.L. et al.: "Improving Digital Credential Management in Browsers" Internet Article. HEPKI-TAG Recommendation, 'Online! Jul. 21, 2000, XP02213004 Retrieved from the Internet: <URL:http://middleware.internet2.edu/hepk i-tag/HEPKI-TAG-Certs-Browser-03.pdf> 'retrieved on Sep. 10, 2002.
Zollner J: "Gateways to Overcome Incompatibilities of Security Mechanisms" Reliable Distributed Systems, 1999. Proceedings of the 19TH IEEE Symposium on Lausanne, Switzerland Oct. 19-22, 1999, Los Alamitos, Cal., USA, IEEE Comput. Soc, US Oct. 19, 1999, pp. 372-377.
Report of Pre-Appeal Examination, Japanese Application No. 2003-504272, dated Jul. 20, 2007.
U.S. Appl. No. 12/480,841 entitled "Certificate Management and Transfer System and Method", issued as U.S. Patent No. 8,015,400 (Prosecution Documents).
U.S. Appl. No. 10/480,615 entitled "Certificate Management and Transfer System and Method", issued as U.S. Patent No. 7,546,453 (Prosecution Documents).
Final Office Action, Japanese Application No. 2003-504272, dated Dec. 7, 2006 (mailed Dec. 11, 2006).
Australian Examiner's Report issued on Oct. 12, 2006 for Australian patent application No. 2005204223.

(56) References Cited

OTHER PUBLICATIONS

Chinese First Office Action (English translation). Application No. 200510095984.7. Dated: Nov. 21, 2008.
Chinese Office Action, issued Mar. 9, 2007, for Chinese Patent Application No. 02817741.X, along with an English translation thereof.
Indian Examination Letter. Application No. 2290/DEL/2005, Dated: Apr. 13, 2007.
Inquiry issued by the Japanese Patent Office on Mar. 13, 2009 for Japanese Patent Application No. 2003-504272.
International Search Report of Application No. PCT/CA02/00889, date of mailing Dec. 23, 2002, 10 pages.
International Search Report of Application No. PCT/CA02/00890, date of mailing Dec. 23, 2002—12 pgs.
Japanese Office Action dated Jun. 17, 2009, Japanese Application No. 2006-293228.
Jin Jing et al.: "Client-server computing in mobile environments" ACM Computing Surveys, Jun. 1999, ACM, USA, vol. 31. No. 2, pp. 117-157, XP002212945.
Korean Decision for Final Rejection (English translation). Application No. 10-2005-0081103. Dated: Apr. 12, 2007.
Levien: "Protecting Internet E-Mail From Prying Eyes," Data Communications, McGraw Hill, New York, US, vol. 25, No. 6, May 1, 1996), pp. 117-118, 120, 122, XP000587586.
Mambo M., et al., "Proxy Signatures: Delegation of the Power to Sign Messages" IEICE Transactions on Fundamentals of Electronics, Communications and Computer Sciences, IEICE Tokyo, JP, vol. E79-A, No. 9, Sep. 1, 1996, pp. 1338-1353, XP000679624.
Notice of Reason for Rejection issued by the Japanese Patent Office on Feb. 16, 2009 for Japanese Patent Application No. 2005-253511.
Notice of Reason for Rejection issued by the Japanese Patent Office on Jan. 5, 2010 for Japanese Patent Application No. 2005-253511.
Notice of Reason for Rejection issued by the Japanese Patent Office on May 12, 2006 for Japanese Patent Application No. 2003-504272.
Office Action issued by the USPTO on Apr. 15, 2009 for U.S. Appl. No. 11/259,372.
Office Action issued by the USPTO on Apr. 27, 2009 for U.S. Appl. No. 11/291,178.
Office Action issued by the USPTO on Jan. 13, 2009 for U.S. Appl. No. 10/914,634.
Office Action issued by the USPTO on Jul. 15, 2008 for U.S. Appl. No. 10/931,983.
Office Action issued by the USPTO on Nov. 13, 2007 for U.S. Appl. No. 10/931,983.
Office Action issued by the Canadian Intellectual Property Office on Jul. 13, 2009 for Canadian Patent Appl. No. 2,517,211.
Office Action issued by the USPTO On Oct. 29, 2009 for U.S. Appl. No. 11/259,372.
Research in Motion Limited, BlackBerry Security with the S/MIME Support Package, version 1.5, Dec. 17, 2003.
Russell S: "Fast checking of individual certificate revocation on small systems" Computer Security Applications Conference, 1999. (ACSAC '99). Proceedings. 15TH Annual Phoenix, AZ, USA Dec. 6-10, 1999, Los Alamitos, CA, USA, IEEE Comput. Soc. US, Dec. 6, 1999, pp. 249-255, XP010368617.
Schumacher: "AutoPGP FAQ, Version 1," Internet Newsgroup 'Online! (Apr. 19, 1994), XP002230742.
Singapore Examination Report. Application No. 200505340-0. Dated: Sep. 19, 2006.
Torvinen V.: "Wireless PKI: Fundamentals", Internet Article, Radicchio White Paper, 'Online! 2000, XP002223159, pp. 12-13.
Crocker S. et al.: "MIME Object Security Services; rfc1848.text". IETF Standard, Internet Engineering Task Force, IETF, CH, Oct. 1995, XP015007633.
Hiroyuki Sawano, Create a Secure Electronic Mail Environment with S/MIME!, @IT Security & Trust, May 30, 2001, URL. http://www.atmarkit.co.jp/fsecurity/special/04smime/smime01.html.
European Supplementary Search Report, Application No. 05826460.7, Feb. 14, 2008.
European Examination Report, Application No. 05826460.7, Apr. 4, 2008.
PCT International Search Report and Written Opinion of the International Searching Authority, Int'ernational App. No. PCT/CA2005/D01956, Jul. 29, 2006.
Kotzanikoloau et al. "Hybrid Key Establishment for Multiphase Self-Organized Sensor Networks", 6 IEEE International Symposium on a World of Wireless Mobile and Multimedia Networks, Jun. 13-16, 2005, pp. 581-587.
Korean Examination Report (English translation). Application No. 10-2007-7011342. Dated: Jul. 15, 2008.
Research in Motion Limited, Blackberry Security White Paper Release 4.0. 2005 Internet Address: http://blackberry.comlknowledgecenterpublicllivelink.exe?func=ll&objld=S2S044&objAction=browse&sort=name.
Policht, Martin, Sal Server 2005 Security—Part 3 Encryption, Database Journal Internet Address: http://www.databasejournal.com/features/mssql/article.php/34S3931.
Encrypt Pre-shared Keys in Cisco IOS Router Configuration Example. Document 1D 46420 Cisco Systems, Internet Address: htto:/lwww.cisco.com/en/US/tech/tk5S3/tk3721technologies_configuration_example09186a00801f2336.shtml.
European Examination Report dated Apr. 20, 2009, European Patent Application No. 05826460.7.
Written Opinion issued on Dec. 23, 2005 by the Australian Patent Office for Singapore patent application No. 200505624-7.
Zollner J: "Gateway to overcome incompatibilities of security mechanisms" Reliable Distributed Systems, 1999. Proceedings of the 19TH IEEE Sympo Sium on Lausanne, Switzerland Oct. 19-22, 1999, Los Alamitos, CAL, USA, IEEE Comput. Soc, US Oct. 19, 1999, pp. 372-377, XP010357040 ISBN: 978-0-7695-0290-8 *the whole document*.
EPO Communication Pursuant to Article 96(2) EPC, issued by the European Patent Office on Dec. 6, 2006 in connection with application No. 04104240.9.
European Search Report of Application No. EP 05022525.9-2146 dated Jan. 24, 2006—4 pgs.
Office Action issued by the USPTO on Jun. 23, 2010 for U.S. Appl. No. 10/486,406.
Co-pending U.S. Appl. No. 12/693,021 entitled "System and Method for Processing Encoded Messages for Exahange with a Mobile Data Communication Device".
Co-pending U.S. Appl. No. 12/691,204 entitled "System and Method for Compressing Secure E-Mail for Exchange With a Mobile Data Communication Device".
Co-pending U.S. Appl. No. 12/686,046 entitled "System and Method for Processing Encoded Messages for Exchange with a Mobile Data Communication Device".
Co-pending U.S. Appl. No. 10/486,406 entitled "System and Method for Processing Encoded Messages", claims 1-34, 36-47 and 49-62 have been allowed (RCE has been filed).
Co-pending U.S. Appl. No. 10/483,282 entitled "System and method for secure message key caching in a mobile communication device", claims 1-49 stand rejected.
Harris, "Content privacy and content security working together," Internet Article, Content Technologies White Paper, pp. 1-10 (Sep. 1999).
Exhibit B-4 cited by KIPO, Patent Court Case No. 2008 HUH 620.
Office Action from USPTO dated May 14, 2007 for U.S. Appl. No. 10/480,615.
Response to Office Action from USPTO dated Nov. 14, 2007 for U.S. Appl. No. 10/480,615.
Office Action from USPTO dated Jan. 22, 2008 for U.S. Appl. No. 10/480,615.
Response to Office Action from USPTO dated Mar. 24, 2008 for U.S. Appl. No. 10/480,615.
Advisory Action from USPTO dated Apr. 11, 2008 for U.S. Appl. No. 10/480,615.
Request for Continued Examination (RCE) Transmittal dated Apr. 22, 2008 for U.S. Appl. No. 10/480,615.
Office Action from USPTO dated Jun. 9, 2008 for U.S. Appl. No. 10/480,615.
Office Action from USPTO (Interview Summary) dated Sep. 4, 2008 for U.S. Appl. No. 10/480,615.

(56) References Cited

OTHER PUBLICATIONS

Response to Office Action from USPTO dated Sep. 9, 2008 for U.S. Appl. No. 10/480,615.
Final Office Action from USPTO dated Nov. 25, 2008 for U.S. Appl. No. 10/480,615.
Response to Office from USPTO dated Jan. 26, 2009 for U.S. Appl. No. 10/480,615.
Notice of Allowance from USPTO dated Feb. 6, 2009 for U.S. Appl. No. 10/480,615.
Office Action for Japanese Application No. 2003-504272, dated Mar. 2009.
Response Brief to Patent Court, Korean Application No. 2003-7016487, dated Apr. 19, 2008.
EPO Communication Pursuant to Article 96(2) EPC, in connection with Application No. 02737687.0-2201, dated Sep. 19, 2006.
Written Opinion issued on Mar. 24, 2003 by European Patent Office for PCT/CA02/00868.
International Preliminary Examination Report for PCT/CA92/00868 dated Jul. 3, 2003.
Intimation of Grant, Indian Application No. 2173/DELNP/2003 dated Mar. 27, 2008 (copy not located).

CERTIFICATE MANAGEMENT AND TRANSFER SYSTEM AND METHOD

Matter enclosed in heavy brackets [ ] appears in the original patent but forms no part of this reissue specification; matter printed in italics indicates the additions made by reissue.

PRIORITY CLAIMS AND CROSS-REFERENCES TO RELATED APPLICATIONS

This application is a *reissue application of U.S. Pat. No. 8,015,400, which issued Sep. 6, 2011 from U.S. patent application Ser. No. 12/480,841, filed Jun. 9, 2009, which is a* continuation of U.S. patent application Ser. No. 10/480,615, filed [on] Dec. 11, 2003[, now U.S. Pat. No. 7,546,453, and entitled "Certificate Management and Transfer System and Method." The complete disclosure of this application, including drawings, is hereby incorporated into this application] *now issued as U.S. Pat. No. 7,546,453 on Jun. 9, 2009, which is the National Stage of International Application No. PCT/CA02/00868, filed Jun. 12, 2002, which claims the benefit of U.S. provisional application Ser. No. 60/297,681, filed Jun. 12, 2001, and of U.S. provisional application Ser. No. 60/365,533, filed Mar. 20, 2002. The entire contents of U.S. patent application Ser. No. 12/480,841, U.S. patent application Ser. No. 10/480,615, U.S. provisional application Ser. No. 60/297,681 and U.S. provisional application Ser. No. 60/365,533 are incorporated herein* by reference.

[This application claims priority from U.S. Provisional Applications Ser. No. 60/297,681, filed on Jun. 12, 2001, and Ser. No. 60/365,533, filed on Mar. 20, 2002. The complete disclosure of each of these provisional applications, including drawings, is hereby incorporated into this application by reference.]

BACKGROUND OF THE INVENTION

1. Field of the Invention

This invention relates generally to the field of secure electronic messaging and in particular to management and transfer of Certificates between secure messaging clients.

2. Description of the State of the Art

Most known secure messaging clients, including for example e-mail software applications operating on desktop computer systems, maintain a data store, or at least a dedicated data storage area, for secure messaging information such as Certificates ("Certs"). A Cert normally includes the public key of an entity as well as identity information that is bound to the public key with one or more digital signatures. In Secure Multipurpose Internet Mail Extension (S/MIME) messaging, for example, a public key is used to verify a digital signature on a received secure message and to encrypt a session key that was used to encrypt a message to be sent. In other secure messaging schemes, public keys may be used to encrypt data or messages. If a public key is not available at the messaging client when required for encryption or digital signature verification, then the Cert must be loaded onto the messaging client before these operations can be performed. Normally, each messaging client establishes communications with a Cert source to obtain any required Certs and manages its own Certs and private keys independently of other messaging clients. However, when a user has more than one messaging client, operating on a desktop or laptop personal computer (PC) and a wireless mobile communication device, for example, then Certs must typically be loaded onto each messaging client from the Cert source.

Therefore, there remains a need for a messaging client with a Cert management and transfer mechanism that simplifies Cert management and loading.

There remains a related need for a Cert management and loading system and method.

SUMMARY

A method of Cert management and transfer between a first messaging client and a second messaging client is provided. The method may include the steps of establishing communications between the first messaging client and the second messaging client, selecting one or more Certs stored on the first messaging client for transfer to the second messaging client, and transferring the selected Certs from the first messaging client to the second messaging client.

A system for Cert management and transfer between a first messaging client and a second messaging client is also provided. The system may comprise, at the first messaging client, a first memory comprising a first Cert store configured to store Certs, a first Cert synchronization (sync) system configured to access the first Cert store, and a first communications interface. At the second messaging client, the system may include a second memory comprising a second Cert store configured to store Certs, a second Cert sync system configured to access the second Cert store, and a second communications interface compatible with the first communications interface. The first Cert sync system is may also be configured to transfer Certs stored in the first Cert store from the first messaging client to the second messaging client when a communications link is established between the first messaging client and the second messaging client via the first communications interface and the second communications interface.

A further system, for transferring Certs between a computer system and a wireless mobile communication device, is also provided. The system may include a serial port associated with the computer system, a mobile device cradle connected to the serial port, the mobile device cradle having an interface, and a mobile device interface associated with the wireless mobile communication device and compatible with the interface of the mobile device cradle. Certs stored at the computer system may be transferred to the wireless mobile communication device when a communications link is established between the computer system and the wireless mobile communication device by placing the wireless mobile communication device in the mobile device cradle.

A wireless mobile communication device is also provided, and may comprise a wireless transceiver, a messaging system coupled to the wireless transceiver, a communications interface, a Cert store configured to store Certs, and a Cert sync system coupled to the Cert store and the communications interface. The messaging system may be configured to store Certs received via the wireless transceiver to the Cert store, and the Cert sync system is configured to store Certs received via the communications interface to the Cert store.

DETAILED DESCRIPTION

A secure message is a message that has been processed by a message sender, or possibly an intermediate system between a message sender and a message receiver, to ensure one or more of data confidentiality, data integrity and user authentication. Common techniques for secure messaging include signing a message with a digital signature and/or encrypting a message. For example, a secure message may be a message that has been signed, encrypted, encrypted and then signed, or signed and then encrypted by a message sender, according to variants of Secure Multipurpose Internet Mail Extensions (S/MIME).

A messaging client allows a system on which it operates to receive and possibly also send messages. Messaging clients may operate on a computer system, a handheld device, or any other system or device with communications capabilities. Many messaging clients also have additional non-messaging functions.

Figure 1:
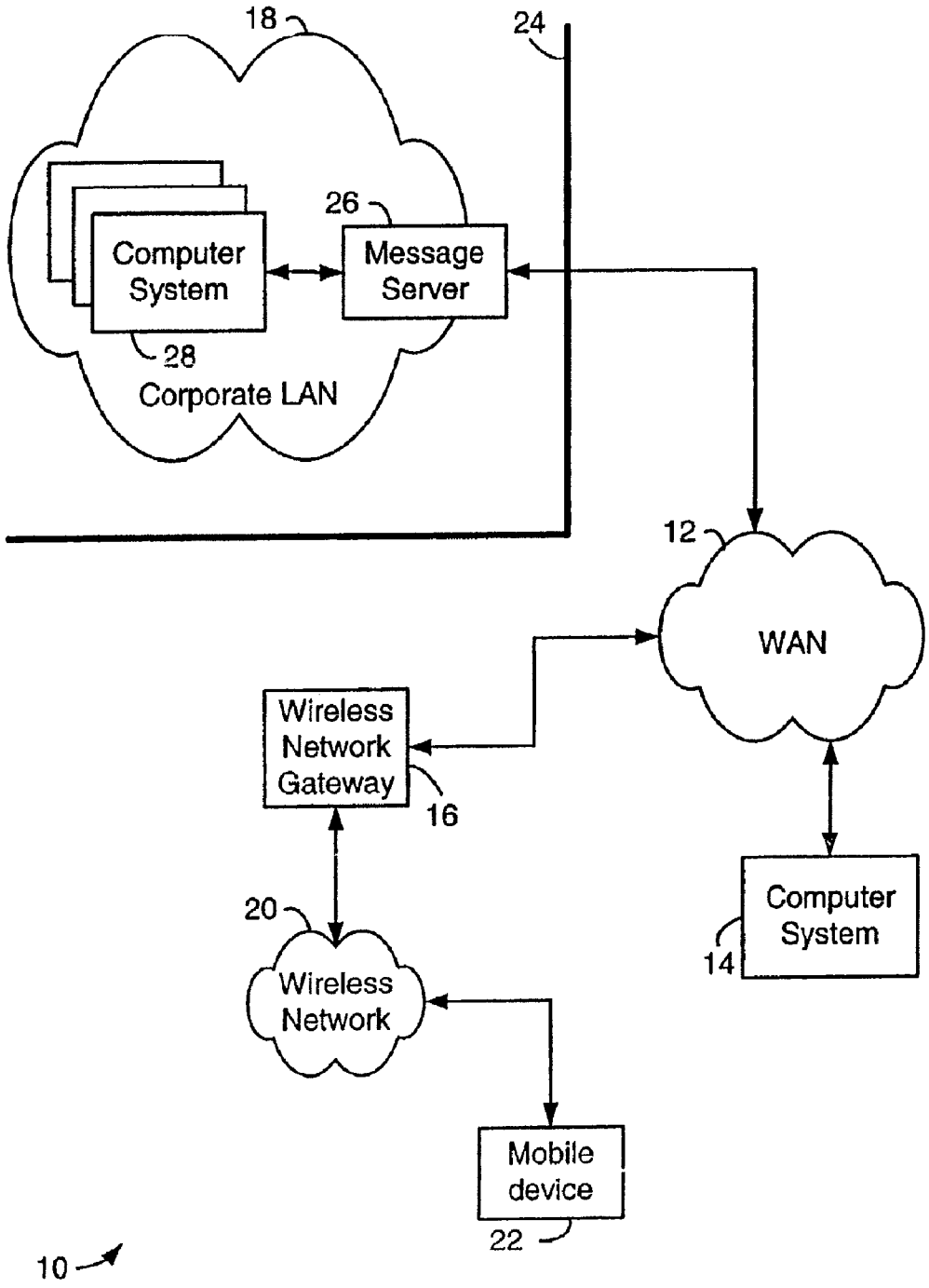
FIG. 1 is a block diagram of an exemplary messaging system.

FIG. 1 is a block diagram of an exemplary messaging system. The system 10 includes a Wide Area Network (WAN) 12, coupled to a computer system 14, a wireless network gateway 16 and a corporate Local Area Network (LAN) 18. The wireless network gateway 16 is also connected to a wireless communication network 20 in which a wireless mobile communication device 22 ("mobile device"), is configured to operate.

The computer system 14 may be a desktop or laptop PC, which is configured to communicate to the WAN 12, the Internet for example. PCs, such as computer system 14, normally access the Internet through an Internet Service Provider (ISP), Application Service Provider (ASP) or the like.

The corporate LAN 18 is an example of a network-based messaging client. It is normally located behind a security firewall 24. Within the corporate LAN 30, a message server 26, operating on a computer behind the firewall 24, acts as the primary interface for the corporation to exchange messages both within the LAN 18, and with other external messaging clients via the WAN 12. Two known message servers 26 include, for example, Microsoft™Exchange Server and Lotus Domino™. These servers are often used in conjunction with Internet mail routers that typically use UNIX-based Sendmail protocols to route and deliver mail. The message server 26 may also provide additional functionality, such as dynamic database storage for data like calendars, todo lists, task lists, e-mail and documentation.

The message server 26 provides messaging capabilities to networked computer systems 28 coupled to the LAN 18. A typical LAN 18 includes multiple computer systems 28, each of which implements a messaging client, such as Microsoft Outlook™, Lotus Notes™, etc. Within the LAN 18, messages are received by the message server 26, distributed to the appropriate mailboxes for user accounts addressed in the received message, and are then accessed by a user through a messaging client operating on a computer system 28.

The wireless gateway 16 provides an interface to a wireless network 20, through which messages may be exchanged with a mobile device 22. The mobile device 22 may for example be a data communication device, a voice communication device, a dual-mode communication device such as most modem cellular telephones having both data and voice communications functionality, a personal digital assistant (PDA) enabled for wireless communications, or a laptop or desktop computer system with a wireless modem.

Such functions as addressing of the mobile device 22, encoding or otherwise transforming messages for wireless transmission, and any other required interface functions may be performed by the wireless gateway 16. The wireless gateway 16 may be configured to operate with more than one wireless network 20, in which case the wireless gateway 16 may also determine a most likely network for locating a given mobile device user and possibly track users as they roam between countries or networks.

Any computer system with access to the WAN 12 may exchange messages with the mobile device 22 through the wireless network gateway 16. Alternatively, private wireless network gateways such as wireless Virtual Private Network (VPN) routers could also be implemented to provide a private interface to a wireless network. For example, a wireless VPN implemented in the LAN 18 may provide a private interface from the LAN 18 to one or more wireless mobile communication devices 22 through the wireless network 20. Such a private interface to wireless mobile communication devices 22 via the wireless network gateway 16 and/or the wireless network 20 may also effectively be extended to entities outside the LAN 18 by providing a message forwarding or redirection system that operates with the message server 26. Such a message redirection system is disclosed in U.S. Pat. No. 6,219,694, which is hereby incorporated into this application by reference. In this type of system, incoming messages received by the message server 26 and addressed to a user of a mobile device 22 are sent through the wireless network interface, either a wireless VPN router, wireless gateway 16 or other interface for example, to the wireless network 20 and to the user's mobile device 22. Another alternate interface to a user's mailbox on a message server 26 may be a Wireless Application Protocol (WAP) gateway. Through a WAP gateway, a list of messages in a user's mailbox on the message server 26, and possibly each message or a portion of each message, may be sent to the mobile device 22. Several example communication systems are described in further detail below.

A wireless network 20 normally delivers messages to and from mobile devices 22 via RF transmissions between base stations and mobile devices 22. The wireless network 20 may for example be: (1) a data-centric wireless network, (2) a voice-centric wireless network, or (3) a dual-mode network that can support both voice and data communications over the same infrastructure. Recently developed networks include: (1) the Code Division Multiple Access (CDMA) network, (2) the Groupe Special Mobile or the Global System for Mobile Communications (GSM) and the General Packet Radio Service (GPRS), both developed by the standards committee of CEPT, and (3) third-generation (3G) networks like Enhanced Data rates for Global Evolution (EDGE) and Universal Mobile Telecommunications Systems (UMTS), which are currently under development.

GPRS is a data overlay on top of the existing GSM wireless network, which is used operating in virtually every country in Europe. Some older examples of data-centric network include, but are not limited to: (1) the Mobitex™ Radio Network ("Mobitex"), and (2) the DataTAC™Radio Network ("DataTAC"). Examples of known voice-centric data networks include Personal Communication Systems (PCS) networks like CDMA, GSM, and Time Division Multiple Access (TDMA) systems that have been available in North America and world-wide for several years.

The mobile device 22 may be a data communication device, a voice communication device, or a multiple-mode device capable of voice, data and other types of communications. An exemplary mobile device 22 is described in further detail below.

Perhaps the most common type of messaging currently in use is e-mail. In a standard e-mail system, an e-mail message is sent by an e-mail sender, possibly through a message server and/or a service provider system, and typically routed through the Internet to one or more message receivers. E-mail messages are normally sent in the clear and use traditional Simple Mail Transfer Protocol (SMTP), RFC822 headers and MIME body parts to define the format of the e-mail message.

In recent years, secure messaging techniques have evolved to protect both the content and integrity of messages such as e-mail messages. S/MIME and Pretty Good Privacy™ (PGP™) are two public key secure e-mail messaging protocols that provide for both encryption, to protect data content, and signing, which both protects the integrity of a message and provides for sender authentication by a message receiver. Secure messages may also be encoded, compressed or otherwise processed in addition to being encrypted and/or signed.

Figure 2:
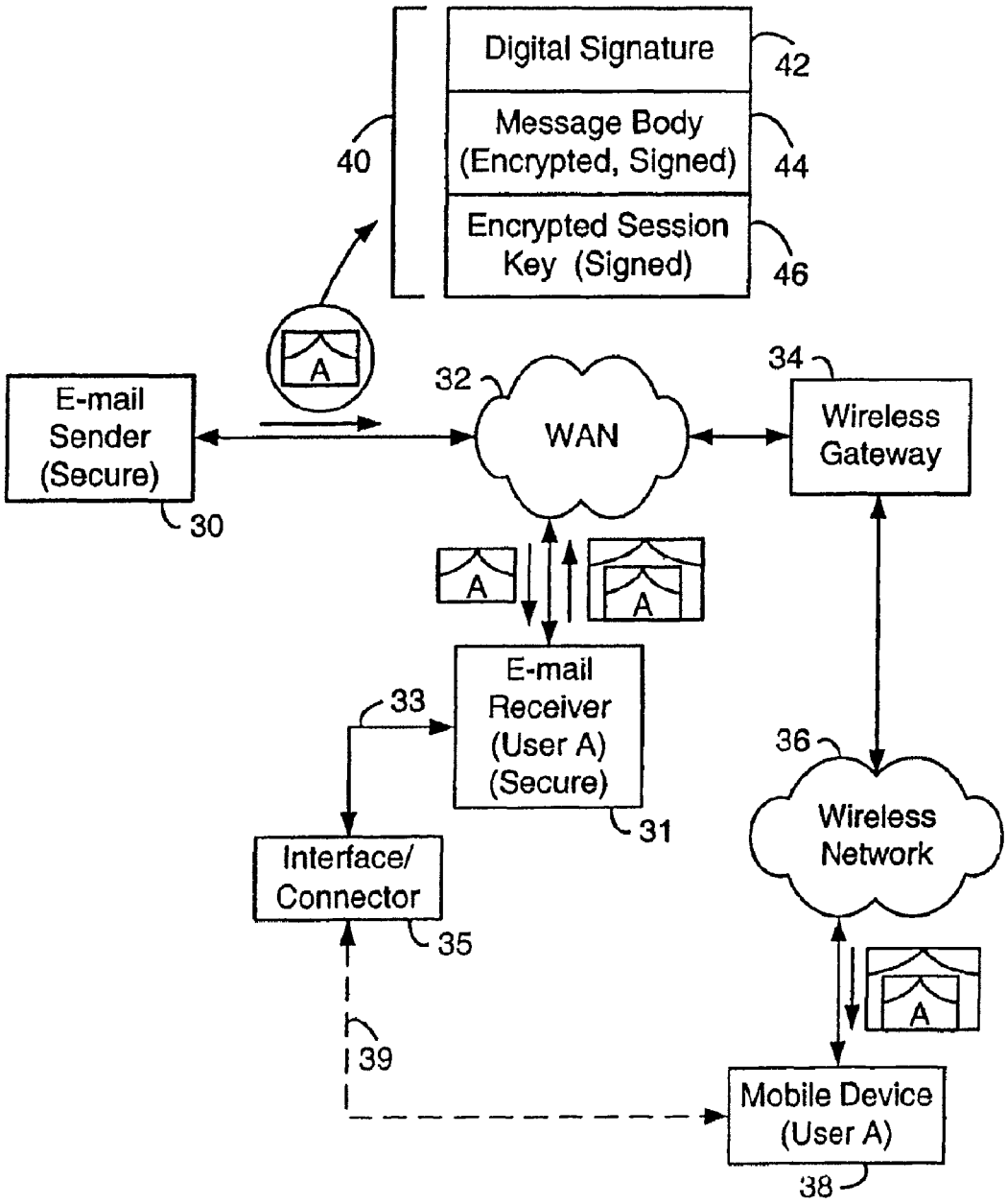
FIG. 2 is a block diagram illustrating a secure e-mail message exchange in a messaging system.

FIG. 2 is a block diagram illustrating a secure e-mail message exchange in a messaging system. The system includes an e-mail sender 30, coupled to a WAN 32 and a wireless gateway 34, which provides an interface between the WAN 32 and a wireless network 36. A mobile device 38 is adapted to operate within the wireless network 36. Also shown in FIG. 2 is a computer system 31 associated with a mobile device 38 or a user of the mobile device 38 as described in further detail below. The computer system 31 has a communication link 33 to an interface or connector 35 through which information may be exchanged with the mobile device 38, as indicated by the dashed line 39.

The e-mail sender 30 may be a PC, such as the system 14 in FIG. 1, or it may be a network-connected computer, such as computer system 28. The e-mail sender 30 may also be a mobile device on which e-mail messages may be composed and sent. The WAN 32, wireless gateway 34, wireless network 36 and mobile device 38 are substantially the same as similarly labelled components in FIG. 1.

According to secure messaging schemes such as S/MIME and PGP, a message is encrypted using a one-time session key chosen by the e-mail sender 30. The session key is used to encrypt the message body and is then itself encrypted using the public key of each addressed message receiver to which the message is to be sent. As shown at 40, a message encrypted in this way includes an encrypted message body 44 and an encrypted session key 46. In this type of message encryption scheme, a message sender such as e-mail sender 30 must have access to the public key of each entity to which an encrypted message is to be sent.

A secure e-mail message sender 30 typically signs a message by taking a digest of the message and signing the digest using the sender's private key. A digest may for example be generated by performing a check-sum, Cyclic Redundancy Check (CRC) or some other preferably non-reversible operation such as a hash on the message. This digest is then signed by the sender using the sender's private key. The private key may be used to perform an encryption or other transformation operation on the digest to generate the digest signature. A digital signature including the digest and the digest signature is then appended to the outgoing message. In addition, a Cert of the sender, which includes the sender's public key and sender identity information that is bound to the public key with one or more digital signatures, and possibly any chained Certs and Certificate Revocation Lists (CRLs) associated with the sender's Cert and any chained Certs may also be attached to a secure message.

The secure e-mail message 40 sent by the e-mail sender 30 may include the digital signature 42, as well as the encrypted message body 44 and the encrypted session key 46, both of which are signed. The sender's Cert, any chained Certs and one or more CRLs may also be included in the message 40. In the S/MIME secure messaging technique, Certs, CRLs and digital signatures are normally placed at the beginning of a message, and the message body is included in a file attachment.

Messages generated by other secure messaging schemes may place message components in a different order than shown or include additional and/or different components. For example, a secure message 40 may include addressing information, such as "To:" and "From:" email addresses, and other header information.

When the secure e-mail message 40 is sent from the e-mail sender 30, it is routed through the WAN 32 to the computer system 31, which in most cases will be either a PC associated with an e-mail address for user A or a network-connected computer workstation which accesses a mailbox on a messaging server. The computer system 31 repackages the secure message 40 into an electronic envelope and forwards the repackaged message to the wireless gateway 34. The repackaged message is then sent through the wireless network 36 to the mobile device 38. At the mobile device 38, the electronic envelope is then removed from the repackaged message to recover the original secure message 40, which may then be processed on the mobile device 38. This message repackaging may involve such operations as compression, encryption and encoding, and will typically be performed by a software module or application operating at the computer system 31. Where the computer system 31 accesses received e-mail on a messaging server however, the repackaging operations may be performed at the messaging server or possibly another system operating in conjunction with the messaging server. At the mobile device 38, inverse operations are similarly performed by an unpackaging system or software module.

Although the computer system 31 is shown as receiving the secure message 40, repackaging the message and then sending the repackaged message to the mobile device 38 in the illustrative example system of FIG. 2, other implementations are also possible. For example, the mobile device 38 may be addressable directly, in which case the message 40 is routed to the wireless gateway 34 instead of to the computer system 31. The wireless gateway 34 then performs any required address translation, encoding or similar functions, if any, and sends the message through the wireless network 36 to the mobile device 38.

In addition, the message may be routed or forwarded to the mobile device 38 through other transport mechanisms than the wireless gateway 34. For example, routing to the wireless network 36 may be accomplished using a wireless VPN router associated with the e-mail sender 30, or, in the case of a message being received at a computer system 31 and then forwarded to the mobile device 38, with the computer system 31.

Each receiver of a signed message, both the computer system 31 and mobile device 38 in FIG. 2, may verify the digital signature 42 by generating a digest of the message body 44 and encrypted session key 46, extracting the digest from the digital signature 42, comparing the generated digest with the digest extracted from the digital signature 42, and verifying the digest signature in the digital signature 42. The digest algorithm used by a secure message receiver is the same as the algorithm used by the message sender, and may be specified for example in a message header or possibly in the digital signature 42. One commonly used digest algorithm is the so-called Secure Hashing Algorithm 1 (SHA1), although other digest algorithms such as Message-Digest Algorithm 5 (MD5) may also be used.

In order to verify the digest signature 42, a message receiver must retrieve the sender's public key and verify the signature on the digest in the digital signature 42 by performing a reverse transformation on the digest signature. For example, if the message sender generated the digest signature by encrypting the digest using its private key, then a receiver would use the sender's public key to decrypt the digest signature to recover the original digest. If a secure message includes the sender's Cert, then the sender's public key may be extracted from the Cert. The sender's public key may instead be retrieved from a local store, for example where the public key was extracted from an earlier message from the sender and stored in a key store in the receiver's local store. Alternatively, the public key may be retrieved from the sender's Cert if it is stored in the local store, or from a Public Key Server (PKS). A PKS is a server that is normally associated with a Certificate Authority (CA) from which a Cert for an entity, including the entity's public key, is available. A PKS might reside within a corporate LAN such as 18 (FIG. 1), or anywhere on the WAN 32, Internet or other network or system through which message receivers may establish communications with the PKS. A sender's Cert may be loaded onto a mobile device 38 from an associated computer system 31, as described in further detail below.

A digest algorithm is preferably a non-reversible function that produces a unique output for every unique input. Therefore, if an original message is changed or corrupted, then the digest generated by the receiver will be different from the digest extracted from the digital signature, and signature verification therefore fails. Because digest algorithms are publicly known, however, it is possible that an entity may alter a secure message, generate a new digest of the altered message, and forward the altered message to any addressed message receivers. In this case, the digest generated at the receiver on the basis of the altered message will match the new digest that was added by the entity that altered the message. The digest signature check is intended to prevent verification of a digital signature in such a situation. Even though the generated and new digests will match, since a sender signs the original digest using its own private key, the entity that altered the message cannot generate a new digest signature that can be verified with the sender's private key. Therefore, although the digests in the altered message match, the digital signature will not be verified since the digest signature verification will fail.

These mathematical operations do not prevent anyone from seeing the contents of the secure message, but do ensure the message has not been tampered with since it was signed by the sender, and that the message was signed by the person as indicated on the 'From' field of the message.

When the digital signature 42 has been verified, or sometimes even if digital signature verification fails, the encrypted message body 44 must then be decrypted before it can be displayed or further processed by a receiving messaging client, the computer system 31 and the mobile device 38 in FIG. 2. A message receiver uses its private key to decrypt the encrypted session key 46 and then uses the decrypted session key to decrypt the encrypted message body 44 and thereby recover the original message.

An encrypted message that is addressed to more than one receiver would include an encrypted version of the session key for each receiver that was encrypted using the public key of the receiver. Each receiver would perform the same digital signature verification operations, but would decrypt a different one of the encrypted session keys using its own private key.

Therefore, in a secure messaging system, a sending messaging client must have access the public key of any receiver to which an encrypted message is to be sent. A receiving messaging client must be able to retrieve the sender's public key, which may be available to a messaging client through various mechanisms, in order to verify a digital signature in a signed message. Although the mobile device 38 is a receiver of the secure message 40, the mobile device 38 may be enabled for two-way communications, and may therefore require public keys for both message sending and message receiving operations.

Public keys are commonly provided in Certs. As described above, a Cert for any particular entity typically includes the entity's public key and identification information that is bound to the public key with a digital signature. Several types of Cert currently in widespread use, including for example X.509 Certs which are typically used in S/MIME. PGP uses Certs with a slightly different format. Systems and methods according to aspects of the present invention may be used with any of these types of Cert, as well as other types of Cert, both currently known types as well as others that may be developed. The digital signature in a Cert is generated by the issuer of the Cert, and can be checked by a message receiver substantially as described above. A Cert sometimes includes an expiry time or validity period from which a messaging client may determine if the Cert has expired. Verification of the validity of a Cert may also involve tracing a certification path through a Cert chain, which includes a user's Cert as well as possibly other Certs to verify that the user's Cert is authentic. A Cert may also be checked against a CRL to ensure that the Cert has not been revoked.

If the digital signature in a Cert for a particular entity is valid, the Cert has not expired or been revoked and the issuer of either the Cert or a chained Cert is trusted, then the public key in the Cert is assumed to be the public key of the entity for which the Cert was issued, also referred to as the subject of the Cert.

Certs may be available to a messaging client from several sources. When a Cert is attached to a received message, the Cert can be extracted from the message and stored by the messaging client. Otherwise, Certs can be requested and downloaded from a PKS on a LAN, the Internet or other network with which a requestor may establish communications. Alternatively, according to an aspect of the present invention, a messaging client may load Certs from other sources than a PKS. Many modem mobile devices are configured for connection to a PC. By connecting such a devices to a PC to download Certs via a physical connection such as a serial port or USB port, over-the-air transfer of Certs may be reduced. If such a physical connection is used to load Certs for entities to which a user expects to send encrypted messages, then these Certs need not be downloaded when encrypted messages are to be sent to any of these entities. A user may similarly load Certs for any entities from which signed messages are expected to be received, such that digital signatures may be verified even if one of these entities does not append its Cert to a signed message.

In known systems, any Cert must be requested from a Cert source and stored on each messaging client. Certs are not normally shared between messaging clients, even when the messaging clients are associated with the same user. In the system of FIG. 2 for example, if user A requires a Cert for another entity, user B, on both the computer system 31 and the mobile device 38, then user B's Cert must be requested and loaded twice—once for the computer system 31 and again for the mobile device 38. Using a Cert management and transfer system, however, user B's Cert need be requested and loaded on only one of the computer system 31 and the mobile device 38.

Figure 3:
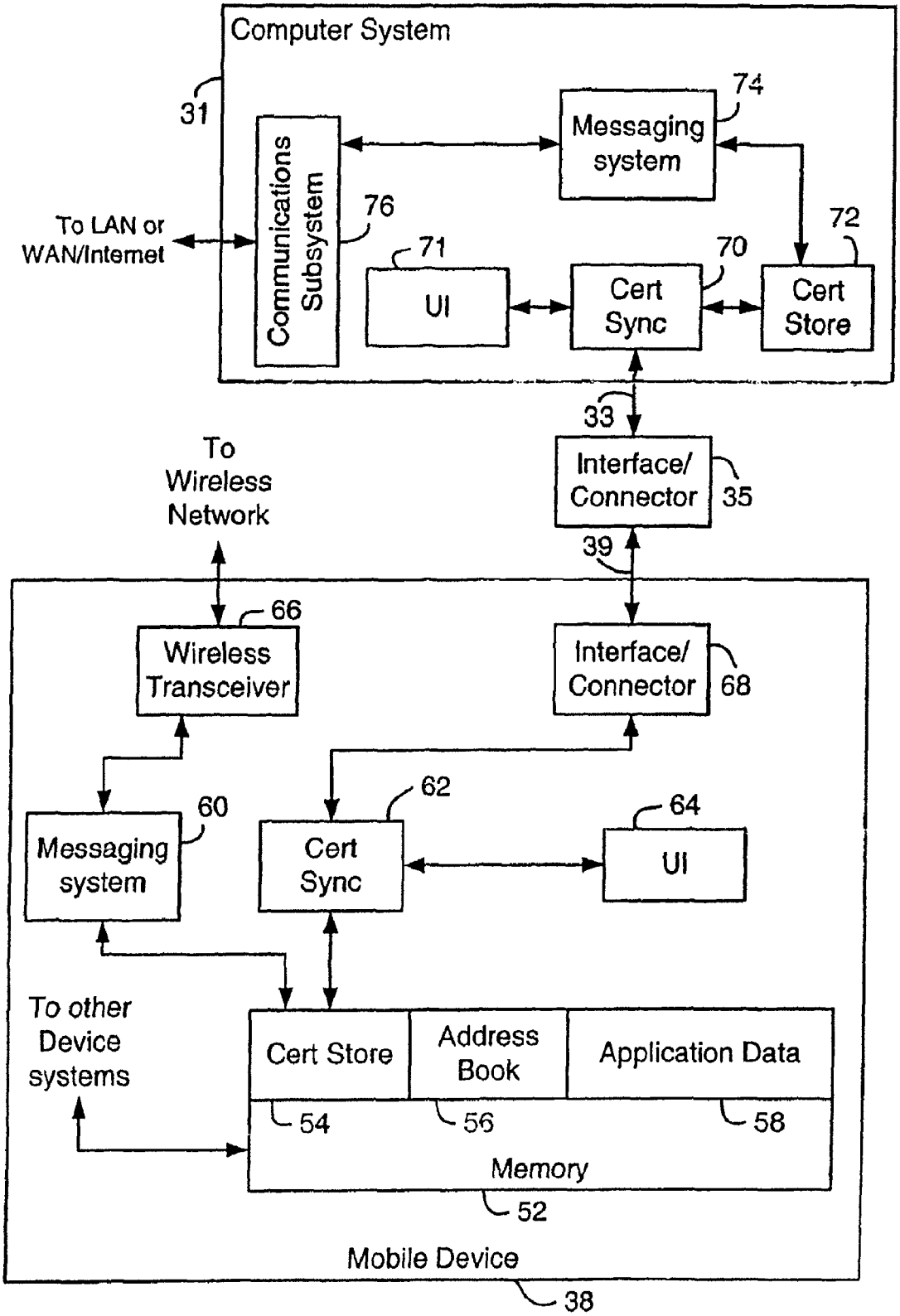
FIG. 3 is a block diagram of a wireless mobile communication device and an associated computer system implementing a Cert management and transfer system.

FIG. 3 is a block diagram of a mobile device and an associated computer system implementing a Cert management and transfer system. In FIG. 3, only the components directly involved in Cert management and transfer operations are shown. It should be apparent to those skilled in the art that a mobile device and computer system will typically include further components. The computer system 31 and a mobile device 38 are illustrative examples of a first messaging client and a second messaging between which Certs may be transferred. The first and second messaging clients could also possibly be two mobile devices or two computer systems.

As shown in FIG. 3, a mobile device 38 incorporating a Cert management and transfer system comprises a memory 52, a messaging system 60, a Cert synchronization (sync) system 62, a user interface (UI) 64, a wireless transceiver 66, and an interface or connector 68. The memory 52 preferably includes a storage area for a Cert store 54, as well as possibly other data stores such as an address book 56 in which messaging contact information is stored, and an application data storage area 58 which stores data associated with software applications on the mobile device 38. Data stores 56 and 58 are illustrative examples of stores that may be implemented in a memory 52 on mobile device 38. The memory 52 may also be used by other device systems in addition to those shown in FIG. 3 to store other types of data.

The memory 52 is a writeable store such as a RAM into which other device components may write data. The Cert store 54 is a storage area dedicated to storage of Certs on the mobile device 38. Certs may be stored in the Cert store 54 in the format in which they are received, or may alternatively be parsed or otherwise translated into a storage format before being written to the store 54.

The messaging system 60 is connected to the wireless transceiver 66 and is thus enabled for communications via a wireless network. The Cert sync system 62 is connected to the interface/connector 68 to allow communication with the computer system 31, through the cooperating interface/connector 35 and connections 39 and 33.

The UI 64 may include such UI components as a keyboard or keypad, a display, or other components which may accept inputs from or provide outputs to a user of the mobile device 38. Although shown as a single block in FIG. 3, it should be apparent that a mobile device 38 typically includes more than one UI, and the UI 64 is therefore intended to represent one or more user interfaces.

The computer system 31 includes a physical connection 33 through which Certs may be transferred to the mobile device 38 via the interface or connector 35. Although shown in FIG. 3 as an external component, the interface/connector 35 may alternatively be internal to the computer system 31. Like the mobile device 38, the computer system 31 includes a Cert sync system 70, which in most implementations will be a software application. The Cert sync system 70 interfaces with a UI 71, which may include one or more input and output components, the connection 33 and the Cert store 72. The Cert store 72 could possibly be any computer storage medium, including for example a local hard disk drive or other memory unit. Certs, which are public information, could also be shared between computer systems within a network for example, such that the store 72 is external but accessible to the computer system 31, for example on a network file server. The messaging system 70 is connected to both the Cert store 72 and the communications subsystem 76.

A messaging client implementing a Cert management and transfer system may still preferably retrieve Certs in a conventional manner. This is represented in FIG. 3 by the connections between the messaging systems 60, 74, Cert stores 54, 72 and a communication system, either the wireless transceiver 66 or communications subsystem 76. Therefore, when the messaging system 60 on the mobile device 38 requires a public key for a sender of a received message or an addressee of a message to be sent, a Cert may be requested and received, from a PKS for example, through the wireless transceiver 66. When a Cert is appended to a received message, the messaging system 60 may extract the Cert from the message and store the Cert to the Cert store 54. The computer system 31 may perform similar operations to obtain any required Certs.

A user of a Cert storage and transfer system as shown in FIG. 3 can also preferably select and transfer Certs to a mobile device 38 from the computer system 31, or from the mobile device 38 to the computer system 31, via a communication link established between the interfaces or connectors 68 and 35. The interfaces or connectors 68 and 35 could be any of a plurality of compatible data transfer components, including for example optical data transfer interfaces such as Infrared Data Association (IrDA) ports, other short-range wireless communications interfaces, or wired interfaces such serial or Universal Serial Bus (USB) and connections. Known short-range wireless communications interfaces include, for example, "Bluetooth" modules and 802.11 modules according to the Bluetooth or 802.11 specifications, respectively. It will be apparent to those skilled in the art that Bluetooth and 802.11 denote sets of specifications, available from the Institute of Electrical and Electronics Engineers (IEEE), relating to wireless LANs and wireless personal area networks, respectively.

Since communications between the computer system 31 and the mobile device 38 need not necessarily be via a physical connection, references to connecting a mobile device to an associated computer includes establishing communications between a computer system and a mobile device through either physical connections or wireless transfer schemes. Thus, the mobile device 38 could be connected to the computer system 31 by placing the mobile device 38 in a mobile device cradle connected to a serial port on the computer system 31, by positioning the mobile device 38 such that an optical port thereof is in a line of sight of a similar port of the computer system 31, or by physically connecting or arranging the mobile device 38 and computer system 31 in some other manner so that data may be exchanged. The particular operations involved in establishing communications between a mobile device and a computer system will be dependent upon the types of Interfaces and/or connectors.

Referring again to FIG. 3, when the mobile device 38 is connected to the computer system 31, the Cert sync system 70 is preferably automatically started. Other operations may also be automatically executed when the mobile device 38 is connected to the computer system 31, preferably in accordance with user-specified settings established at the computer system 31, the mobile device 38, or both.

The Cert sync system 70 may access the Cert store 72 to determine which Certs are stored therein. The Cert sync system 70 then preferably generates a list of stored Certs on a UI 71, preferably a display screen, on the computer system 31. Certs could be listed for example in the order in which they are stored in the Cert store 72, in order of frequency of use, in alphabetical order of the name of the entity for which the Cert was issued (i.e. the subject name) or any other default or user-configured order. In this list, Certs are preferably identified by subject name, or if contact information for the subject of a Cert is stored in an address book or similar contact information store on the computer system 31, a Cert could alternatively be identified using a portion of the contact information such as a familiar name for example.

A user may then choose which of the Certs stored on the computer system 31 should be transferred to the mobile device 38, using a mouse, keyboard or other input device that may be implemented as a UI 71 associated with the computer system 31. The selected Certs are then transferred to the mobile device 38 via the connections and interfaces 33, 35, 39, 68. A Cert transfer operation may for example be an add operation, to add selected Certs to the Cert store 54 on the mobile device 38, an update operation, for example to replace an expired Cert in the Cert store 54 on the mobile device 38 with a selected Cert or to replace a less frequently used Cert with one that is or is expected to be more frequently used, or a replace all operation, in which all Certs in the Cert store on the mobile device 38 are deleted and the selected Certs are stored to the Cert store 54. Other types of Cert transfers are also possible and may be selectable or configurable using the Cert sync system 70, the Cert sync system 62, or both.

On the mobile device 38, Certs are received by the Cert sync system 62 and processed according to the type of transfer operation selected by the user to store transferred Certs to the Cert store 54. Transferred Certs may be added to the store in addition to (add operation) or instead of (update operation) Certs already stored in the Cert store 54 or after the Certs in the Cert store 54 have been deleted (replace all operation). When Certs are transferred to a mobile device 38 in this manner, a message sender or an intermediate system through which messages are sent to the mobile device 38 need not send Certs along with secure messages to the mobile device 38. An intermediate system, if present, may also strip Certs and possibly other relatively bulky information from a received secure message before it is sent to the mobile device 38 if the Certs have already been transferred to the mobile device 38.

Since memory 52 on a mobile device 38 tends to be limited, data stores such as the Cert store 54 may have sufficient space to store only a certain number of Certs. When the Cert store 54 is full, no new Certs can be transferred from the computer system 31 to the Cert store 54 unless one or more existing Certs in the Cert store 54 are overwritten or deleted. Cert store 54 overflow could be handled by either the mobile device Cert sync system 62, the computer system Cert sync system 70, or both. For example, the Cert sync system 62 in the mobile device 38 may be configured to implement a least recently used (LRU) replacement policy in the Cert store 54, whereby a least recently used Cert will automatically be overwritten if a new Cert is to be loaded into the mobile device 38 when the Cert store 54 is full. Alternatively, the Cert sync system 62 may be configured to alert the Cert sync system 70 if the Cert store 54 is or becomes full while the mobile device 38 and computer system 31 are connected. An alert could also or instead be returned to the Cert sync system 70 when a user attempts to add a Cert to a full Cert store 54. In this case, the user could then be prompted via a UI 71 to choose whether or not a Cert in the Cert store 54 should be replaced with the Cert to be added and if so, possibly to select a Cert that should be replaced. Such a scheme may also allow a user to abort an add operation when a Cert store 54 is full.

The Cert sync system 70 on the computer system 31 may also check each Cert in the Cert store 72 to ensure that only valid Certs are transferred to the mobile device 38. This may involve checking one or more CRLs, an expiry time or validity period, and possibly submitting a status inquiry to an external system (not shown) for each Cert. Any Certs that have expired or are no longer valid may be deleted from the Cert store 72 and are preferably not included in the Cert list generated by the Cert sync system 70. Detection of an expired or invalid Cert in the Cert store 72 may also trigger either a request for a new Cert for the entity identified in the subject name or like field of the expired or invalid Cert, or a user prompt to select a further action, such as request a new Cert or simply delete the expired or invalid Cert without requesting a new one.

If the messaging system 74 or another component in the computer system 31 periodically checks the status of all stored Certs, then a status check by the Cert sync system 70 might not be necessary every time that the mobile device is connected to the computer system 31. In either case, a user can be assured that Certs transferred from the computer system 31 to the mobile device 38 are valid at the time of transfer. However, due primarily to the size of CRLs, processing loads associated with Cert status checking and network latency when Cert status information must be requested from an external source, Cert status checking on a mobile device 38 tends to be problematic and therefore is not commonly performed. Although valid at the time of transfer, Certs in the Cert store 54 that expire, are revoked or become invalid after the time of transfer might not always be detected on a mobile device 38.

Cert management systems and methods may alleviate this problem of expired, revoked or invalid Certs in the Cert store 54 of the mobile device 38. The Cert sync systems 62 and 70 can exchange Cert information between the mobile device 38 and computer system 31. The Cert sync system 62, similar to the Cert sync system 70 as described above, is preferably configured to access the Cert store 54 to generate at least a list of Certs stored in the Cert store 54 when the mobile device 38 is connected to the computer system 31. Depending upon the information required by the Cert sync system 70 to check the status of a Cert, a copy of the Certs in the Cert store 54, not just a list of Certs, may be passed to the Cert sync system 70. The list or complete Certs may be passed to the Cert sync system 70 either automatically or in response to a request to the Cert sync system 62 from the Cert sync system 70. Using information in the list or Certs, as well as any CRLs, expiry times or validity periods and any information from external sources if required, the Cert sync system 70 checks the status of each Cert.

If a Cert on the mobile device 38 is expired, revoked or invalid, the Cert sync system 70 preferably retrieves a new Cert to replace the expired Cert, from either its own Cert store 72 or an external Cert source. Alternatively, a user may be prompted (via a UI 71 or 64) to select whether the Cert should tie deleted from the Cert store 54 or a new Cert should be retrieved. The Cert sync system 62 then either deletes or replaces the expired, revoked or invalid Cert with a new Cert from the computer system 31.

Either the mobile device 38 or the computer system 31 preferably maintains a record of at least the most recent Cert check for Certs on the mobile device 38, such that the frequency of Cert checking for Certs stored on the mobile device 38 is controllable. When the mobile device 38 is connected to the computer system 31, this Cert check record is accessed to determine if the Certs stored in the Cert store 54 should be checked.

Coordinated operation of the Cert sync systems 62 and 70 also provides for further Cert management functions. Since the Cert sync system 70 has access to both its own Cert store 72 and, through the Cert sync system 62, the mobile device Cert store 54, separate lists of Certs stored at the computer system 31 and the mobile device 38 may be generated and displayed to a user. The user can then easily determine which Certs have already been loaded onto the mobile device 38. Alternatively, Certs that are stored in the mobile device Cert store 54 may be removed from the list of Certs that are stored in the Cert store 72, such that only those Certs available in the Cert store 72 that are not stored in the mobile device Cert store 54 are displayed for selection and transfer to the mobile device 38.

If a list of Certs stored in the mobile device Cert store 54 is displayed to a user on the computer system 31, the user is better able to manage the Certs in the mobile device store 54. For example, a user may select a Cert from the device list for deletion, and can also determine how many Certs are stored on the mobile device 38 and possibly how much space is remaining in the Cert store 54.

Certs may also be transferred from the mobile device 38 to the computer system 31. As described above, both the computer system 31 and the mobile device 38 may retrieve Certs from a variety of sources. When the computer system 31 and the mobile device 38 are separately addressable for example, they may receive secure messages from different senders and thus require different Certs to process the messages. Different Certs may also be required to send secure messages to different recipients. If a required Cert was not transferred from the computer system 31 to the Cert store 54, then the mobile device 38 may retrieve the Cert from another source via a wireless network for example. In this case, the mobile device Cert store 54 contains a Cert that might not be available in the Cert store 72 of the computer system 31. Such a Cert may be transferred from the mobile device 38 to the computer system 31 substantially as described above.

Similarly, where the mobile device UI 64 includes a display screen and one or more input devices such as a keyboard, thumbwheel and the like, Cert management and transfer operations could be controlled by the Cert sync system 62.

When Cert management operations are complete, both the mobile device 38 and the computer system 31 preferably revert to a normal operating mode. If the Cert sync-systems 62 and 70 are embodied as software applications, the applications may be closed or may instead end automatically after selected Certs have been transferred. The Cert sync systems 62, 70 may also be configured to start only when one or each of the sync systems is invoked by a user instead of automatically when the mobile device 38 is connected to the computer system 31.

Figure 4:
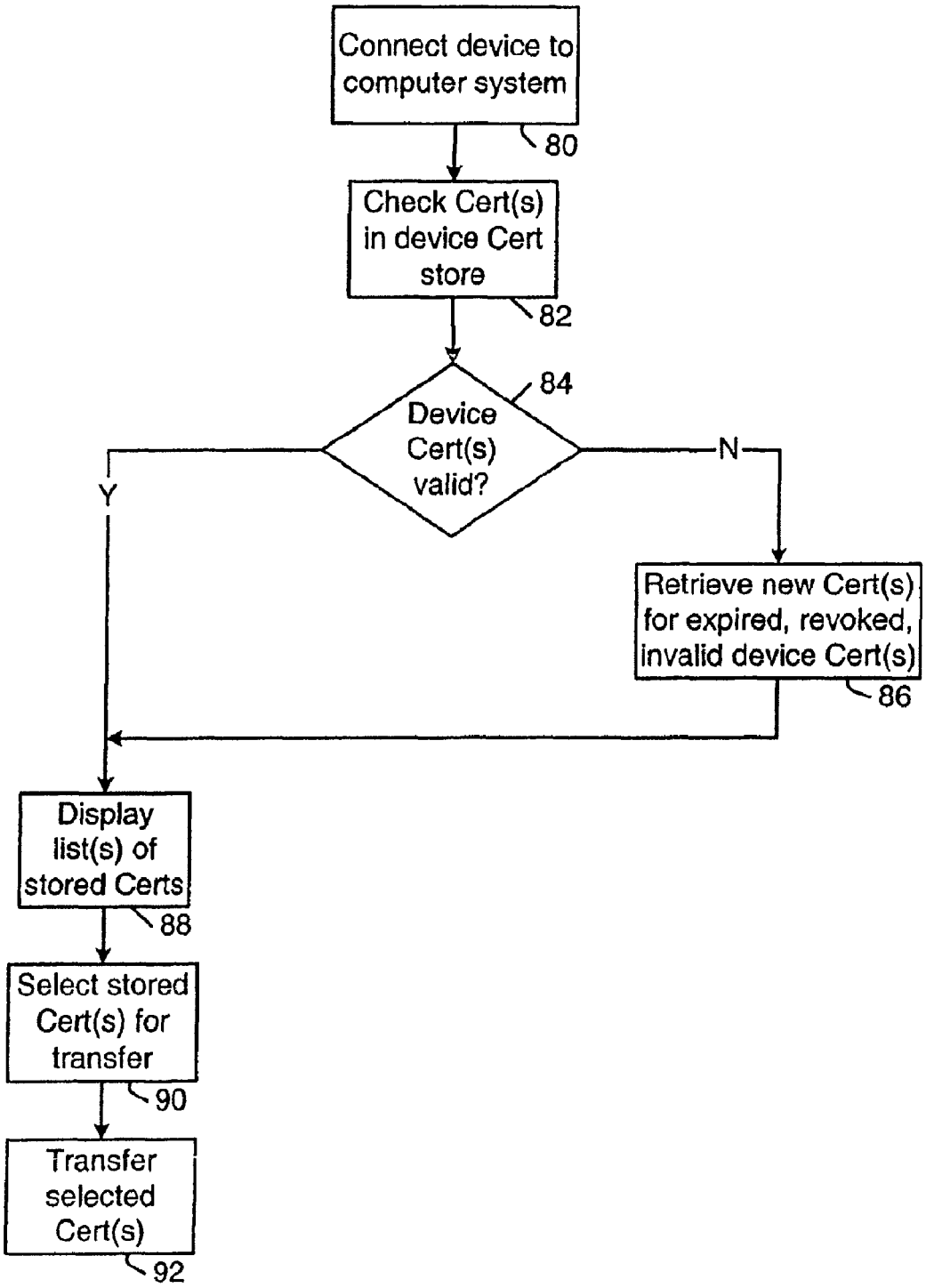
FIG. 4 is a flow diagram illustrating a method of Cert management and transfer between messaging clients.

FIG. 4 is a flow diagram illustrating a method of Cert management and transfer between messaging clients. In FIG. 4, a mobile device and a computer system are used as illustrative examples of a first messaging client and a second messaging client which implement a Cert management and transfer method, although as described above in conjunction with FIG. 3, Certs may also be exchanged between mobile devices or between multiple computer systems.

The method begins at step 80, when a mobile device is connected to a computer system. Step 80 involves establishing communications between the mobile device and the computer system, for example via a physical link such as a serial or USB connection or a wireless link such as an optical, Bluetooth, 802.11 or other short-range communication link. At step 82, the computer system may check the status of any Certs stored in a Cert store on the mobile device, and possibly retrieve a new Cert for each expired, revoked or invalid Cert in the mobile device Cert store, as described above. Step 86 may be automatic or may alternatively be dependent upon a user response to a prompt or alert generated when one or more of the Certs stored on the mobile device are found to be expired, revoked or invalid.

If none of the Certs on the mobile device are expired, revoked or invalid, when new Certs have been or will not be retrieved for any such Certs, or if no status check is performed for Certs stored on the mobile device, then a list of Certs stored in a Cert store on the computer system is generated and displayed to the user, at step 88. As described above, a list of the Certs stored at each messaging client may be displayed to a user. The user may then select one or more stored Certs from either of the lists at step 90 and the selected Certs are transferred from one messaging client to the other messaging client at step 92. Steps 90 and 92 may be repeated for each selected Cert. Alternatively, a user may select a plurality of Certs at step 90 and transfer each Cert at step 92 without requiring further action on the part of the user. The Cert transfer at step 92 may be from the computer system to the mobile device or from the mobile device to the computer system. Cert selection and transfer steps 90 and 92 may be repeated as often as necessary to perform desired Cert transfer operations. Cert store overflow handling may be configurable, for example according to an LRU replacement policy, or in response to a further user selection to replace a stored Cert or abort the Cert transfer operation.

Since a computer system normally has faster and more powerful processing resources and access to a much higher-speed communication link to a PKS or other Cert source than a mobile device, Cert loading from a remote source to a computer system is a relatively fast and simple process. Therefore, most Cert transfers at step 92 will likely be from the computer system to the mobile device be to the mobile device. However, Cert transfers between computer systems is also possible, when Certs are to be managed and/or shared between computer systems. Sharing of Certs between computer systems within a corporate LAN for example would minimize communications with external PKSs or other Cert sources for any Certs that have been retrieved from the external sources by a computer system within the LAN.

Cert transfers at step 92 may add selected Certs to a Cert store on a messaging client or replace any or all of the Certs in the Cert store on the messaging client, as described above. Although not explicitly shown in FIG. 4, other Cert management operations than Cert transfers may also be performed after lists of stored Certs are generated and displayed at step 88. For example, Certs may be selected for deletion or other operations than transfer to another messaging client.

Figure 5:
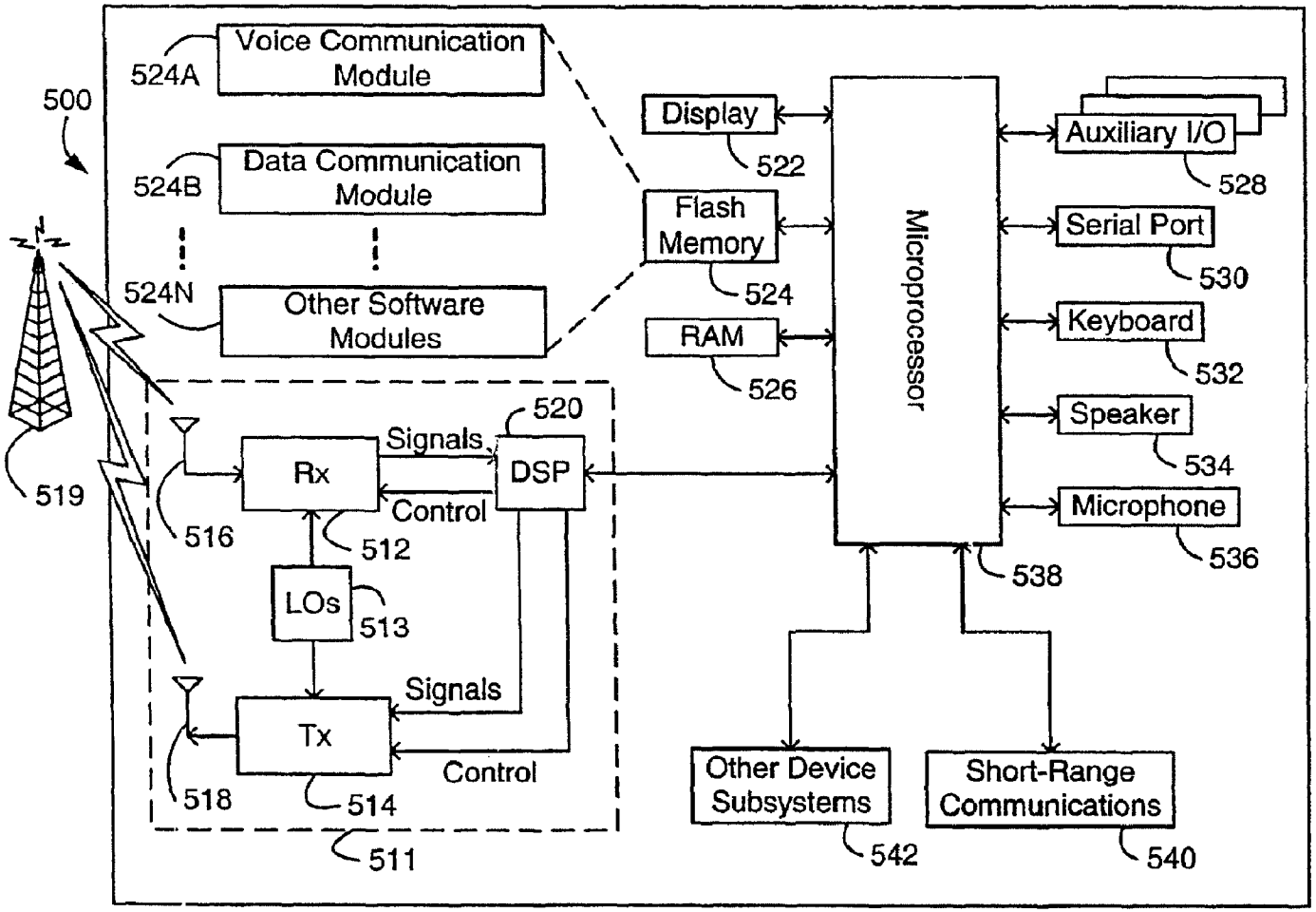
FIG. 5 is a block diagram of a wireless mobile communication device as an example of a messaging client in which systems and methods according to aspects of the present invention may be implemented.

FIG. 5 is a block diagram of a wireless mobile communication device as an example of a messaging client in which the present invention may be implemented. The mobile device 500 is preferably a two-way communication device having at least voice and data communication capabilities. The mobile device 500 preferably has the capability to communicate with other computer systems on the Internet. Depending on the functionality provided by the mobile device, the mobile device may be referred to as a data messaging device, a two-way pager, a cellular telephone with data messaging capabilities, a wireless Internet appliance, or a data communication device (with or without telephony capabilities). As mentioned above, such devices are referred to generally herein simply as mobile devices.

The mobile device 500 includes a transceiver 511, a microprocessor 538, a display 522, Flash memory 524, RAM 526, auxiliary input/output (I/O) devices 528, a serial port 530, a keyboard 532, a speaker 534, a microphone 536, a short-range wireless communications sub-system 540, and may also include other device sub-systems 542. The transceiver 511 preferably includes transmit and receive antennas 516, 518, a receiver (Rx) 512, a transmitter (Tx) 514, one or more local oscillators (LOs) 513, and a digital signal processor (DSP) 520. Within the Flash memory 524, the mobile device 500 preferably includes a plurality of software modules 524A-524N that can be executed by the microprocessor 538 (and/or the DSP 520), including a voice communication module 524A, a data communication module 524B, and a plurality of other operational modules 524N for carrying out a plurality of other functions.

The mobile device 500 is preferably a two-way communication device having voice and data communication capabilities. Thus, for example, the mobile device 500 may communicate over a voice network, such as any of the analog or digital cellular networks, and may also communicate over a data network. The voice and data networks are depicted FIG. 5 by the communication tower 519. These voice and data networks may be separate communication networks using separate infrastructure, such as base stations, network controllers, etc., or they may be integrated into a single wireless network. References to the network 519 should therefore be interpreted as encompassing both a single voice and data network and separate networks.

The communication subsystem 511 is used to communicate with the network 519. The DSP 520 is used to send and receive communication signals to and from the transmitter 514 and receiver 512, and may also exchange control information with the transmitter 514 and receiver 512. If the voice and data communications occur at a single frequency, or closely-spaced set of frequencies, then a single LO 513 may be used in conjunction with the transmitter 514 and receiver 512. Alternatively, if different frequencies are utilized for voice communications versus data communications, then a plurality of LOs 513 can be used to generate a plurality of frequencies corresponding to the network 519. Although two antennas 516, 518 are depicted in FIG. 5, the mobile device 500 could be used with a single antenna structure. Information, which includes both voice and data information, is communicated to and from the communication module 511 via a link between the DSP 520 and the microprocessor 538.

The detailed design of the communication subsystem 511, such as frequency band, component selection, power level, etc., will be dependent upon the communication network 519 in which the mobile device 500 is intended to operate. For example, a mobile device 500 intended to operate in a North American market may include a communication subsystem 511 designed to operate with the Mobitex or DataTAC mobile data communication networks and also designed to operated with any of a variety of voice communication networks, such as AMPS, TDMA, CDMA, PCS, etc., whereas a mobile device 500 intended for use in Europe may be configured to operate with the GPRS data communication network and the GSM voice communication network. Other types of data and voice networks, both separate and integrated, may also be utilized with the mobile device 500.

Depending upon the type of network 519, the access requirements for the mobile device 500 may also vary. For example, in the Mobitex and DataTAC data networks, mobile devices are registered on the network using a unique identification number associated with each device. In GPRS data networks, however, network access is associated with a subscriber or user of the mobile device 500. A GPRS device typically requires a subscriber identity module ("SIM"), which is required in order to operate the mobile device 500 on a GPRS network. Local or non-network communication functions (if any) may be operable, without the SIM, but the mobile device 500 will be unable to carry out any functions involving communications over the network 519, other than any legally required operations, such as '911' emergency calling.

After any required network registration or activation procedures have been completed, the mobile device 500 may send and receive communication signals, preferably including both voice and data signals, over the network 519. Signals received by the antenna 516 from the communication network 519 are routed to the receiver 512, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 via the antenna 518. Although a single transceiver 511 is shown in FIG. 5 for both voice and data communications, it is possible that the mobile device 500 may include two distinct transceivers, a first transceiver for transmitting and receiving voice signals, and a second transceiver for transmitting and receiving data signals.

In addition to processing the communication signals, the DSP 520 may also provide for receiver and transmitter control. For example, the gain levels applied to communication signals in the receiver 512 and transmitter 514 may be adaptively controlled through automatic gain control algorithms implemented in the DSP 520. Other transceiver control algorithms could also be implemented in the DSP 520 in order to provide more sophisticated control of the transceiver 511.

The microprocessor 538 preferably manages and controls the overall operation of the mobile device 500. Many types of microprocessors or microcontrollers could be used here, or, alternatively, a single DSP 520 could be used to carry out the functions of the microprocessor 538. Low-level communication functions, including at least data and voice communications, are performed through the DSP 520 in the transceiver 511. Other, high-level communication applications, such as a voice communication application 524A, and a data communication application 524B may be stored in the Flash memory 524 for execution by the microprocessor 538. For example, the voice communication module 524A may provide a high-level user interface operable to transmit and receive voice calls between the mobile device 500 and a plurality of other voice devices via the network 519. Similarly, the data communication module 524B may provide a high-level user interface operable for sending and receiving data, such as e-mail messages, files, organizer information, short text messages, etc., between the mobile device 500 and a plurality of other data devices via the network 519. On the mobile device 500, a secure messaging software application, incorporating software modules corresponding to the messaging system 60 and Cert sync system 62 in FIG. 3 for example, may operate in conjunction with the data communication module 524B in order to implement the techniques described above.

The microprocessor 538 also interacts with other device subsystems, such as the display 522, Flash memory 524, random access memory (RAM) 526, auxiliary input/output (I/O) subsystems 528, serial port 530, keyboard 532, speaker 534, microphone 536, a short-range communications subsystem 540 and any other device subsystems generally designated as 542. For example, the modules 524A-N are executed by the microprocessor 538 and may provide a high-level interface between a user of the mobile device and the mobile device. This interface typically includes a graphical component provided through the display 522, and an input/output component provided through the auxiliary I/O 528, keyboard 532, speaker 534, or microphone 536. Such interfaces are designated generally as UI 64 in FIG. 3.

Some of the subsystems shown in FIG. 5 perform communication-related functions, whereas other subsystems may provide "resident" or on-device functions. Notably, some subsystems, such as keyboard 532 and display 522 may be used for both communication-related functions, such as entering a text message for transmission over a data communication network, and device-resident functions such as a calculator or task list or other PDA type functions.

Operating system software used by the microprocessor 538 is preferably stored in a persistent store such as Flash memory 524. In addition to the operating system and communication modules 524A-N, the Flash memory 524 may also include a file system for storing data. A storage area is also preferably provided in the Flash memory 524 to store Certs, address book entries and possibly other information required for messaging, shown as data stores 54, 56 and 58 in FIG. 3. The operating system, specific device applications or modules, or parts thereof, may be temporarily loaded into a volatile store, such as RAM 526 for faster operation. Moreover, received communication signals may also be temporarily stored to RAM 526, before permanently writing them to a file system located in the persistent store 524.

An exemplary application module 524N that may be loaded onto the mobile device 500 is a personal information manager (PIM) application providing PDA functionality, such as calendar events, appointments, and task items. This module 524N may also interact with the voice communication module 524A for managing phone calls, voice mails, etc., and may also interact with the data communication module 524B for managing e-mail communications and other data transmissions. Alternatively, all of the functionality of the voice communication module 524A and the data communication module 524B may be integrated into the PIM module.

The Flash memory 524 preferably provides a file system to facilitate storage of PIM data items on the device. The PIM application preferably includes the ability to send and receive data items, either by itself, or in conjunction with the voice and data communication modules 524A, 524B, via the wireless network 519. The PIM data items are preferably seamlessly integrated, synchronized and updated, via the wireless network 519, with a corresponding set of data items stored or associated with a host computer system, thereby creating a mirrored system for data items associated with a particular user.

The mobile device 500 may also be manually synchronized with a host system by placing the mobile device 500 in an interface cradle, which couples the serial port 530 of the mobile device 500 to the serial port of the host system. The serial port 530 may also be used to enable a user to set preferences through an external device or software application, to download other application modules 524N for installation, and to manage Certs on a device as described above. This wired download path may further be used to load an encryption key onto the device, which is a more secure method than exchanging encryption information via the wireless network 519.

Additional application modules 524N may be loaded onto the mobile device 500 through the network 519, through an auxiliary I/O subsystem 528, through the serial port 530, through the short-range communications subsystem 540, or through any other suitable subsystem 542, and installed by a user in the Flash memory 524 or RAM 526. Such flexibility in application installation increases the functionality of the mobile device 500 and may provide enhanced on-device functions, communication-related functions, or both. For example, secure communication applications may enable electronic commerce functions and other such financial transactions to be performed using the mobile device 500.

When the mobile device 500 is operating in a data communication mode, a received signal, such as a text message or a web page download, will be processed by the transceiver 511 and provided to the microprocessor 538, which will preferably further process the received signal for output to the display 522, or, alternatively, to an auxiliary I/O device 528. A Cert received by the transceiver 511, in response to a request to a PKS or attached to a secure message for example, will be processed as described above to add the Cert to a Cert store in the Flash memory 524 if it has not already been stored, and to extract and store contact information in a new address book entry in the Flash memory 524 if necessary. A user of mobile device 500 may also compose data items, such as email messages, using the keyboard 532, which is preferably a complete alphanumeric keyboard laid out in the QWERTY style, although other styles of complete alphanumeric keyboards such as the known DVORAK style may also be used. User input to the mobile device 500 is further enhanced with a plurality of auxiliary I/O devices 528, which may include a thumbwheel input device, a touchpad, a variety of switches, a rocker input switch, etc. The composed data items input by the user may then be transmitted over the communication network 519 via the transceiver 511.

When the mobile device 500 is operating in a voice communication mode, the overall operation of the mobile device 500 is substantially similar to the data mode, except that received signals are preferably output to the speaker 534 and voice signals for transmission are generated by a microphone 536. In addition, the secure messaging techniques described above might not necessarily be applied to voice communications. Alternative voice or audio I/O subsystems, such as a voice message recording subsystem, may also be implemented on the mobile device 500. Although voice or audio signal output is preferably accomplished primarily through the speaker 534, the display 522 may also be used to provide an indication of the identity of a calling party, the duration of a voice call, or other voice call related information. For example, the microprocessor 538, in conjunction with the voice communication module 524A and the operating system software, may detect the caller identification information of an incoming voice call and display it on the display 522.

A short-range communications subsystem 540 may also be included in the mobile device 500. For example, the subsystem 540 may include an infrared device and associated circuits and components, or a Bluetooth or 802.11 short-range wireless communication module to provide for communication with similarly-enabled systems and devices. Thus, Cert management and transfer operations as described above may be enabled on the mobile device 500 via the serial port 530 or other short-range communications subsystem 540. More than one such interface may be used, depending upon the type of messaging client with which mobile device Cert management and/or transfer operations will be performed. For mobile device to computer system operations, the serial port 530 may be used, whereas for mobile device to mobile device operations, another short-range communications subsystem 540 could be used.

Although an example secure message transfer has been described above in the context of a communication system as shown in FIG. 2, Cert management and transfer may also be useful in other types of communication systems.

Figure 6:
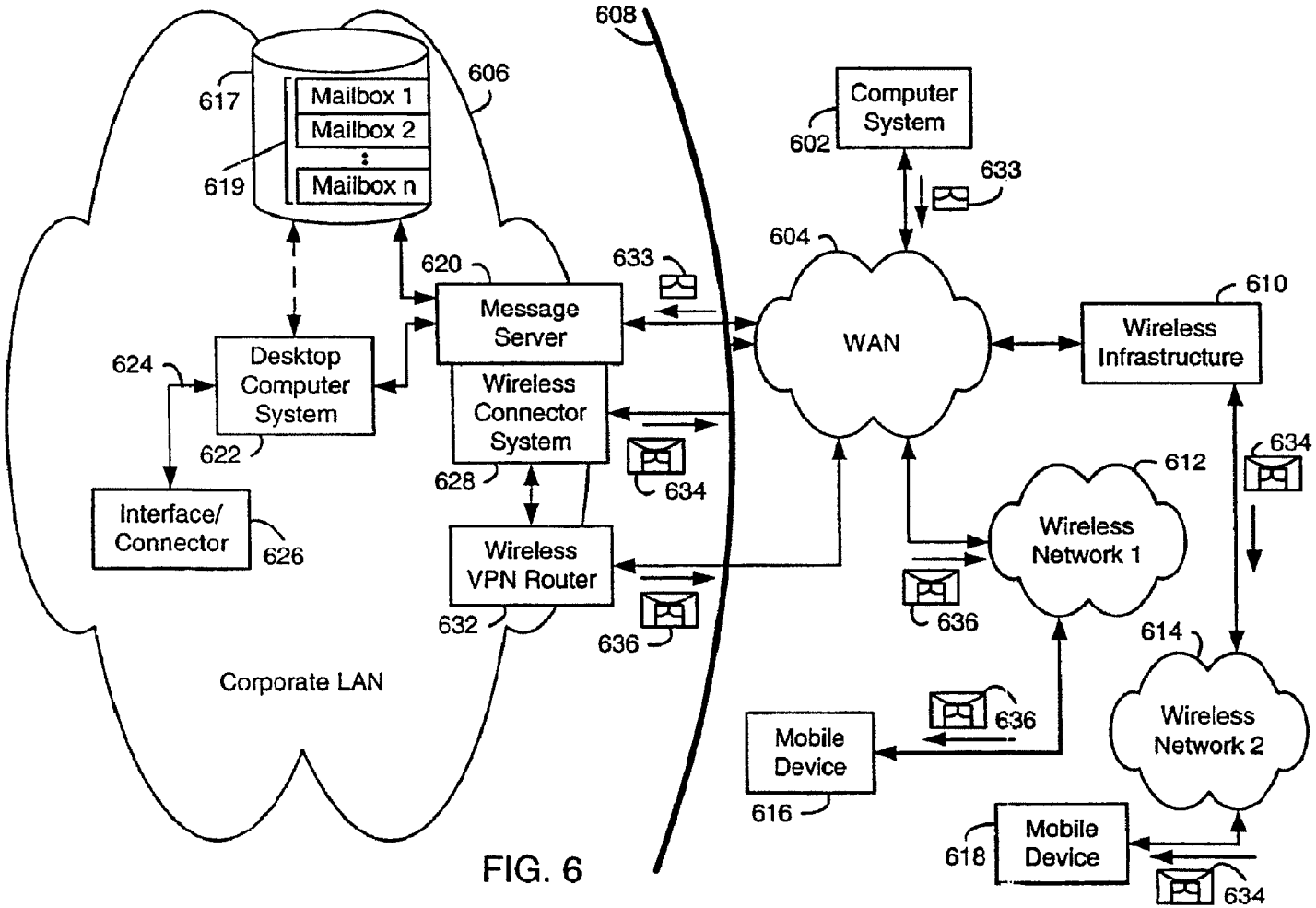
FIG. 6 is a block diagram showing an example communication system.

FIG. 6 is a block diagram showing an example communication system. In FIG. 6, there is shown a computer system 602, a WAN 604, corporate LAN 606 behind a security firewall 608, wireless infrastructure 610, wireless networks 612 and 614, and mobile devices 616 and 618. The corporate LAN 606 includes a message server 620, a wireless connector system 628, a data store 617 including at least a plurality of mailboxes 619, a desktop computer system 622 having a communication link directly to a mobile device such as through physical connection 624 to an interface or connector 626, and a wireless VPN router 632. Operation of the system in FIG. 6 will be described below with reference to the messages 33, 34 and 36.

The computer system 602, like computer system 14 in FIG. 1, may, for example, be a laptop, desktop or palmtop computer system configured for connection to the WAN 604. Such a computer system may connect to the WAN 604 via an ISP or ASP. Alternatively, the computer system 602 may be a network-connected computer system that accesses the WAN 604 through a LAN or other network. Many modem mobile devices are enabled for connection to a WAN through various infrastructure and gateway arrangements, so that the computer system 602 may also be a mobile device.

The corporate LAN 606 is an illustrative example of a central, server-based messaging system that has been enabled for wireless communications. The corporate LAN 606 may be referred to as a "host system", in that it hosts both a data store 617 with mailboxes 619 for messages, as well as possibly further data stores (not shown) for other data items, that may be sent to or received from mobile devices 616 and 618, and the wireless connector system 628, the wireless VPN router 632, or possibly other components enabling communications between the corporate LAN 606 and one or more mobile devices 616 and 618. In more general terms, a host system may be one or more computers at, with or in association with which a wireless connector system is operating. The corporate LAN 606 is one preferred embodiment of a host system, in which the host system is a server computer running within a corporate network environment operating behind and protected by at least one security communications firewall 608. Other possible central host systems include ISP, ASP and other service provider or mail systems. Although the desktop computer system 624 and interface/connector 626 may be located outside such host systems, wireless communication operations may be similar to those described below.

The corporate LAN 606 implements the wireless connector system 628 as an associated wireless communications enabling component, which will normally be a software program, a software application, or a software component built to work with at least one or more message server. The wireless connector system 628 is used to send user-selected information to, and to receive information from, one or more mobile devices 616 and 618, via one or more wireless networks 612 and 614. The wireless connector system 628 may be a separate component of a messaging system, as shown in FIG. 6, or may instead be partially or entirely incorporated into other communication system components. For example, the message server 620 may incorporate a software program, application, or component implementing the wireless connector system 628, portions thereof, or some or all of its functionality.

The message server 620, running on a computer behind the firewall 608, acts as the main interface for the corporation to exchange messages, including for example e-mail, calendaring data, voice mail, electronic documents, and other personal information management (PIM) data with the WAN 604, which will typically be the Internet. A message server is often used in conjunction with Internet mail routers to route and deliver messages. The particular intermediate operations and computers will be dependent upon the specific type of message delivery mechanisms and networks via which messages are exchanged, and therefore have not been shown in FIG. 6. The functionality of the message server 20 may extend beyond message sending and receiving, providing such features as dynamic database storage for data like calendars, todo lists, task lists, e-mail and documentation, as described above.

Message servers such as 620 normally maintain a plurality of mailboxes 619 in one or more data stores such as 617 for each user having an account on the server. The data store 817 includes mailboxes 619 for a number of ("n") user accounts. Messages received by the message server 620 that Identify a user, a user account, a mailbox, or possibly another address associated with a user, account or mailbox 619 as a message recipient will typically be stored in the corresponding mailbox 619. If a message is addressed to multiple recipients or a distribution list, then copies of the same message may be stored to more than one mailbox 619. Alternatively, the message server 620 may store a single copy of such a message in a data store accessible to all of the users having an account on the message server, and store a pointer or other identifier in each recipient's mailbox 619. In typical messaging systems, each user may then access his or her mailbox 619 and its contents using a messaging client such as Microsoft Outlook or Lotus Notes, which normally operates on a PC, such as the desktop computer system 622, connected in the LAN 606. Although only one desktop computer system 622 is shown in FIG. 6, those skilled in the art will appreciate that a LAN will typically contain many desktop, notebook and laptop computer systems. Each messaging client normally accesses a mailbox 619 through the message server 620, although in some systems, a messaging client may enable direct access to the data store 617 and a mailbox 619 stored thereon by the desktop computer system 622. Messages may also be downloaded from the data store 617 to a local data store (not shown) on the desktop computer system 622.

Within the corporate LAN 606, the wireless connector system 628 operates in conjunction with the message server 620. The wireless connector system 628 may reside on the same computer system as the message server 620, or may instead be implemented on a different computer system. Software implementing the wireless connector system 628 may also be partially or entirely integrated with the message server 620. The wireless connector system 628 and the message server 620 are preferably designed to cooperate and interact to allow the pushing of information to mobile devices 616, 618. In such an installation, the wireless connector system 628 is preferably configured to send information that is stored in one or more data stores associated with the corporate LAN 606 to one or more mobile devices 616, 618, through the corporate firewall 608 and via the WAN 604 and one of the wireless networks 612, 614. For example, a user that has an account and associated mailbox 619 in the data store 617 may also have a mobile device, such as 616. As described above, messages received by the message server 620 that identify a user, account or mailbox 619 are stored to a corresponding mailbox 619 by the message server 620. If a user has a mobile device, such as 616, messages received by the message server 620 and stored to the user's mailbox 619 are preferably detected by the wireless connector system 628 and sent to the user's mobile device 616. This type of functionality represents a "push" message sending technique. The wireless connector system 628 may instead employ a "pull" technique, in which items stored in a mailbox 619 are sent to a mobile device 616, 618 responsive to a request or access operation made using the mobile device, or some combination of both techniques.

The use of a wireless connector 628 thereby enables a messaging system including a message server 620 to be extended so that each user's mobile device 616, 618 has access to stored messages of the message server 620. Although the systems and methods described herein are not restricted solely to a push-based technique, a more detailed description of push-based messaging may be found in U.S. Pat. No. 6,219,694, referenced above, and in the following co-pending and commonly-owned U.S. patent applications, all of which are related to the '694 patent: U.S. patent application Ser. No. 09/401,868, Ser. No. 09/545,963, Ser. No. 09/528,495; Ser. No. 09/545,962, and Ser. No. 09/649,755. The complete disclosure of the '694 patent and each of these applications, including drawings and claims, is hereby incorporated into this application by reference. This push technique uses a wireless friendly encoding, compression and encryption technique to deliver all information to a mobile device, thus effectively extending the company firewall 8 to include the mobile devices 616, 618.

As shown in FIG. 6, there are several paths for exchanging information with a mobile device 616, 618 from the corporate LAN 606. One possible information transfer path is through the physical connection 624 such as a serial port, using an interface or connector 626. This path may be useful for example for bulk information, such as Certs and CRLs as described above, or updates often performed at initialization of a mobile device 616, 618 or periodically when a user of a mobile device 616, 618 is working at a computer system in the LAN 606, such as the computer system 622. The physical connection 624 may also be used to transfer other information from a desktop computer system 622 to a mobile device 616, 618, including private keys such as private encryption or signature keys associated with the desktop computer system 622.

Private key exchange using a physical connection 624 and connector or interface 626 allows a user's desktop computer system 622 and mobile device 616 or 618 to share at least one identity for accessing all encrypted and/or signed mail. The user's desktop computer system 622 and mobile device 616 or 618 can thereby also be used to manage and transfer private keys, so that either the host system 622 or mobile device 616 or 618 can process secure messages addressed to the user's mailbox or account on the message server 620.

In known "synchronization" type wireless messaging systems, a physical path has also been used to transfer messages from mailboxes 619 associated with a message server 620 to mobile devices 616 and 618.

Another method for data exchange with a mobile device 616, 618 is over-the-air, through the wireless connector system 628 and using wireless networks 612, 614. As shown in FIG. 6, this could involve a Wireless VPN router 632, if available in the network 606, or, alternatively, a traditional WAN connection to wireless infrastructure 610 that provides an interface to one or more wireless networks 612, 614. The Wireless VPN router 632 provides for creation of a VPN connection directly through a specific wireless network 612 to a wireless device 616. Such a Wireless VPN router 632 may be used in conjunction with a static addressing scheme. For example, if the wireless network 612 is an Internet Protocol (IP) based wireless network, then the new IP Version 6 (IPV6) should provide enough IP addresses to dedicate an IP address to every mobile device 616 configured to operate within the network 612 and thus make it possible to push information to a mobile device 616 at any time. A primary advantage of using a wireless VPN router 632 is that it could be an off-the-shelf VPN component which would not require wireless infrastructure 610. A VPN connection may use a Transmission Control Protocol over IP (TCP/IP) or User Datagram Protocol over IP (UDP/IP) connection to deliver messages directly to and from a mobile device 616.

If a wireless VPN router 632 is not available, then a link to a WAN 604, normally the Internet, is a commonly used connection mechanism that may be employed by the wireless connector system 628. To handle the addressing of the mobile device 616 and any other required interface functions, wireless infrastructure 610 is preferably used. One example of a wireless infrastructure 610 is the gateway 16 in FIG. 1. The wireless infrastructure 610 may also determine a most likely wireless network for locating a given user, and track users as they roam between countries or networks. In wireless networks such as 612 and 614, messages are normally delivered to and from mobile devices 616, 618 via RF transmissions between base stations (not shown) and the mobile devices 616, 618.

A plurality of connections to wireless networks 612 and 614 may be provided, including, for example, Integrated Services Digital Network (ISDN), Frame Relay or T1 connections using the TCP/IP protocol used throughout the Internet. The wireless networks 612 and 614 could represent distinct, unique and unrelated networks, or they could represent the same network in different countries, and may be any of the different types of networks described above in conjunction with the wireless network 20 in FIG. 1.

In some implementations, more than one over-the-air information exchange mechanism may be provided in the corporate LAN 606. In the exemplary communication system of FIG. 6 for example, mobile devices 616, 618 associated with users having mailboxes 619 associated with user accounts on the message server 620 are configured to operate on different wireless networks 612 and 614. If the wireless network 612 supports IPv6 addressing, then the wireless VPN router 632 may be used by the wireless connector system 628 to exchange data with any mobile device 616 operating within the wireless network 612. The wireless network 614 may be a different type of wireless network, however, such as the Mobitex network, in which case information may instead be exchanged with a mobile device 18 operating within the wireless network 614 by the wireless connector system 628 via a connection to the WAN 604 and the wireless infrastructure 610.

Operation of the system in FIG. 6 will now be described using an example of an e-mail message 633 sent from the computer system 602 and addressed to at least one recipient having both an account and mailbox 619 or like data store associated with the message server 620 and a mobile device 616 or 618. However, the e-mail message 633 is intended for illustrative purposes only. The exchange of other types of information between the corporate LAN 606 is preferably also enabled by the wireless connector system 628.

The e-mail message 633, sent from the computer system 602 via the WAN 604, may be fully in the clear, or signed with a digital signature and/or encrypted, depending upon the particular messaging scheme used. For example, if the computer system 602 is enabled for secure messaging using S/MIME, then the e-mail message 633 may be signed, encrypted, or both, and processed as described above.

E-mail messages such as 633 normally use traditional Simple Mail Transfer Protocol (SMTP), RFC822 headers and Multipurpose Internet Mail Extensions (MIME) body parts to define the format of the e-mail message. These techniques are all well known to one in the art. The e-mail message 633 arrives at the message server 620, which determines into which mailboxes 619 the e-mail message 633 should be stored. As described above, a message such as the e-mail message 633 may include a user name, a user account, a mailbox identifier, or other type of identifier that may be mapped to a particular account or associated mailbox 619 by the message server 620. For an e-mail message 633, recipients are typically identified using e-mail addresses corresponding to a user account and thus a mailbox 619.

The wireless connector system 628 sends or mirrors, via a wireless network 612 or 614, certain user-selected data items or parts of data items from the corporate LAN 606 to the user's mobile device 616 or 618, preferably, upon detecting that one or more triggering events has occurred. A triggering event includes, but is not limited to, one or more of the following: screen saver activation at a user's networked computer system 622, disconnection of the user's mobile device 616 or 618 from the interface 626, or receipt of a command sent from a mobile device 616 or 618 to the host system to start sending one or more messages stored at the host system. Thus, the wireless connector system 628 may detect triggering events associated with the message server 620, such as receipt of a command, or with one or more networked computer systems 622, including the screen saver and disconnection events described above. When wireless access to corporate data for a mobile device 616 or 618 has been activated at the LAN 606, for example when the wireless connector system 628 detects the occurrence of a triggering event for a mobile device user, data items selected by the user are preferably sent to the user's mobile device. In the example of the e-mail message 633, assuming that a triggering event has been detected, the arrival of the message 633 at the message server 620 is detected by the wireless connector system 628. This may be accomplished, for example, by monitoring or querying mailboxes 619 associated with the message server 620, or, if the message server 620 is a Microsoft Exchange server, then the wireless connector system 628 may register for advise syncs provided by the Microsoft Messaging Application Programming Interface (MAPI) to thereby receive notifications when a new message is stored to a mailbox 619.

When a data item such as the e-mail message 633 is to be sent to a mobile device 616 or 618, the wireless connector system 628 preferably repackages the data item in a manner that is transparent to the mobile device, so that information sent to and received by the mobile device appears similar to the information as stored on and accessible at the host system, LAN 606 in FIG. 6. One preferred repackaging method includes wrapping received messages to be sent via a wireless network 612, 614 in an electronic envelope that corresponds to the wireless network address of the mobile device 616, 618 to which the message is to be sent. Alternatively, other repackaging methods could be used, such as special-purpose TCP/IP wrapping techniques. Such repackaging preferably also results in e-mail messages sent from a mobile device 616 or 618 appearing to come from a corresponding host system account or mailbox 619 even though they are composed and sent from a mobile device. A user of a mobile device 616 or 618 may thereby effectively share a single e-mail address between a host system account or mailbox 619 and the mobile device.

Repackaging of the e-mail message 633 is indicated at 634 and 636. Repackaging techniques may be similar for any available transfer paths or may be dependent upon the particular transfer path, either the wireless infrastructure 610 or the wireless VPN router 632. For example, the e-mail message 633 is preferably compressed and encrypted, either before or after being repackaged at 634, to thereby effectively provide for secure transfer to the mobile device 618. Compression reduces the bandwidth required to send the message, whereas encryption ensures confidentiality of any messages or other information sent to mobile devices 616 and 618. In contrast, messages transferred via a VPN router 632 might only be compressed and not encrypted, since a VPN connection established by the VPN router 632 is inherently secure. Messages are thereby securely sent, via either encryption at the wireless connector system 628, which may be considered a non-standard VPN tunnel or a VPN-like connection for example, or the VPN router 632, to mobile devices 616 and 618. Accessing messages using a mobile device 616 or 618 is thus no less secure than accessing mailboxes at the LAN 606 using the desktop computer system 622.

When a repackaged message 634 or 636 arrives at a mobile device 616 or 618, via the wireless infrastructure 610, or via the wireless VPN router 632, the mobile device 616 or 618 removes the outer electronic envelope from the repackaged message 634 or 636, and performs any required decompression and decryption operations. When the original message 633 is a secure message, further processing may also be performed by the mobile device 616, 618. Messages sent from a mobile device 616 or 618 and addressed to one or more recipients are preferably similarly repackaged, and possibly compressed and encrypted, and sent to a host system such as the LAN 606. The host system may then remove the electronic envelope from the repackaged message, decrypt and decompress the message if desired, and route the message to the addressed recipients.

Another goal of using an outer envelope is to maintain at least some of the addressing information in the original e-mail message 633. Although the outer envelope used to route information to mobile devices 616, 618 is addressed using a network address of one or more mobile devices, the outer envelope preferably encapsulates the entire original e-mail message 633, including at least one address field, possibly in compressed and/or encrypted form. This allows original "To", "From" and "CC" addresses of the e-mail message 633 to be displayed when the outer envelope is removed and the message is displayed on a mobile device 616 or 618. The repackaging also allows reply messages to be delivered to addressed recipients, with the "From" field reflecting an address of the mobile device user's account or mailbox on the host system, when the outer envelope of a repackaged outgoing message sent from a mobile device is removed by the wireless connector system 628. Using the user's account or mailbox address from the mobile device 616 or 618 allows a message sent from a mobile device to appear as though the message originated from the user's mailbox 619 or account at the host system rather than the mobile device.

Figure 7:
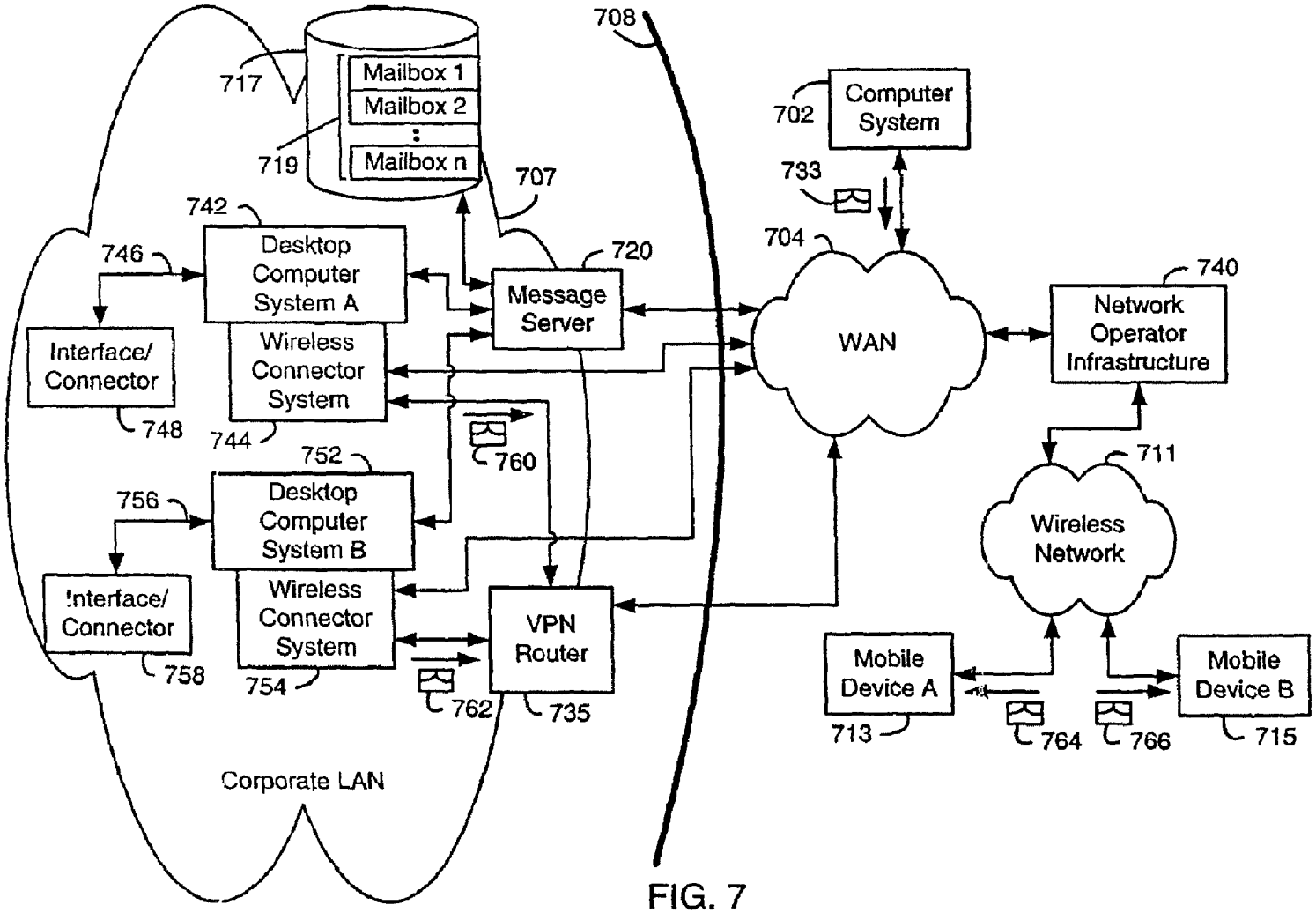
FIG. 7 is a block diagram of an alternative example communication system.

FIG. 7 is a block diagram of an alternative exemplary communication system, in which wireless communications are enabled by a component associated with an operator of a wireless network. As shown in FIG. 7, the system includes a computer system 702, WAN 704, a corporate LAN 707 located behind a security firewall 708, network operator infrastructure 740, a wireless network 711, and mobile devices 713 and 715. The computer system 702, WAN 704, security firewall 708, message server 720, data store 717, mailboxes 719, and VPN router 735 are substantially the same as the similarly-labelled components in FIG. 6. However, since the VPN router 735 communicates with the network operator infrastructure 740, it need not necessarily be a wireless VPN router in the system of FIG. 7. The network operator infrastructure 740 enables wireless information exchange between the LAN 707 and mobile devices 713, 715, respectively associated with the computer systems 742 and 752 and configured to operate within the wireless network 711. In the LAN 707, a plurality of desktop computer systems 742, 752 are shown, each having a physical connection 746, 756 to an interface or connector 748, 758. A wireless connector system 744, 754 is operating on or in conjunction with each computer system 742, 752.

The wireless connector systems 744, 754 may be similar to the wireless connector system 628 described above, in that they enable data items, such as e-mail messages and other items that are stored in mailboxes 719, and possibly data items stored in a local or network data store, to be sent from the LAN 707 to one or more mobile devices 713, 715. In FIG. 7 however, the network operator infrastructure 740 provides an interface between the mobile devices 713, 715 and the LAN 707. As above, operation of the system shown in FIG. 7 will be described below in the context of an e-mail message 733 as an illustrative example of a data item that may be sent to a mobile device 713, 715.

When an e-mail message 733, addressed to one or more recipients having an account on the message server 720, is received by the message server 720, the message, or possibly a pointer to a single copy of the message stored in a central mailbox or data store, is stored into the mailbox 719 of each such recipient. Once the e-mail message 733 or pointer has been stored to a mailbox 719, it may preferably be accessed using a mobile device 713 or 715. In the example shown in FIG. 7, the e-mail message 733 has been addressed to the mailboxes 719 associated with both desktop computer systems 742 and 752 and thus both mobile devices 713 and 715.

As those skilled in the art will appreciate, communication network protocols commonly used in wired networks such as the LAN 707 and/or the WAN 704 are not suitable or compatible with wireless network communication protocols used within wireless networks such as 711. For example, communication bandwidth, protocol overhead and network latency, which are primary concerns in wireless network communications, are less significant in wired networks, which typically have much higher capacity and speed than wireless networks. Therefore, mobile devices 713 and 715 cannot normally access the data store 717 directly. The network operator infrastructure 740 provides a bridge between the wireless network 711 and the LAN 707.

The network operator infrastructure 740 enables a mobile device 713, 715 to establish a connection to the LAN 707 through the WAN 704, and may, for example, be operated by an operator of the wireless network 711 or a service provider that provides wireless communication service for mobile devices 713 and 715. In a pull-based system, a mobile device 713, 715 may establish a communication session with the network operator infrastructure 740 using a wireless network compatible communication scheme, preferably a secure scheme such as Wireless Transport Layer Security (WTLS) when information should remain confidential, and a wireless web browser such as a Wireless Application Protocol (WAP) browser. A user may then request (through manual selection or pre-selected defaults in the software residing in the mobile device) any or all information, or just new information for example, stored in a mailbox 719 in the data store 717 at the LAN 707. The network operator infrastructure 740 then establishes a connection or session with a wireless connector system 744, 754, using Secure Hypertext Transfer Protocol (HTTPS) for example, if no session has already been established. As above, a session between the network operator infrastructure 740 and a wireless connector system 744, 754 may be made via a typical WAN connection or through the VPN router 735 if available. When time delays between receiving a request from a mobile device 713, 715 and delivering requested information back to the device are to be minimized, the network operator infrastructure 740 and the wireless connector systems 744, 754 may be configured so that a communication connection remains open once established.

In the system of FIG. 7, requests originating from mobile device A 713 and B 715 would be sent to the wireless connector systems 744 and 754, respectively. Upon receiving a request for information from the network operator infrastructure 740, a wireless connector system 744, 754 retrieves requested information from a data store. For the e-mail message 733, the wireless connector system 744, 754 retrieves the e-mail message 733 from the appropriate mailbox 719, typically through a messaging client operating in conjunction with the computer system 742, 752, which may access a mailbox 719 either via the message server 720 or directly. Alternatively, a wireless connector system 744, 754 may be configured to access mailboxes 719 itself, directly or through the message server 720. Also, other data stores, both network data stores similar to the data store 717 and local data stores associated with each computer system 742, 752, may be accessible to a wireless connector system 744, 754, and thus to a mobile device 713, 715.

If the e-mail message 733 is addressed to the message server accounts or mailboxes 719 associated with both computer systems 742 and 752 and devices 713 and 715, then the e-mail message 733 may be sent to the network operator infrastructure 740 as shown at 760 and 762, which then sends a copy of the e-mail message to each mobile device 713 and 715, as indicated at 764 and 766. Information may be transferred between the wireless connector systems 744, 754 and the network operator infrastructure 740 via either a connection to the WAN 704 or the VPN router 735. When the network operator infrastructure 740 communicates with the wireless connector systems 744, 754 and the mobile devices 713, 715 via different protocols, translation operations may be performed by the network operator infrastructure 740. Repackaging techniques may also be used between the wireless connector systems 744, 754 and the network operator infrastructure 740, and between each mobile device 713, 715 and the network operator infrastructure 740.

Messages or other information to be sent from a mobile device 713, 715 may be processed in a similar manner, with such information first being transferred from a mobile device 713, 715 to the network operator infrastructure 740. The network operator infrastructure 740 may then send the information to a wireless connector system 744, 754 for storage in a mailbox 719 and delivery to any addressed recipients by the message server 720 for example, or may alternatively deliver the information to the addressed recipients.

The above description of the system in FIG. 7 relates to pull-based operations. The wireless connector systems 744, 754 and the network operator infrastructure may instead be configured to push data items to mobile devices 713 and 715. A combined push/pull system is also possible. For example, a notification of a new message or a list of data items currently stored in a data store at the LAN 707 could be pushed to a mobile device 713, 715, which may then be used to request messages or data items from the LAN 707 via the network operator infrastructure 740.

If mobile devices associated with user accounts on the LAN 707 are configured to operate within different wireless networks, then each wireless network may have an associated wireless network infrastructure component similar to 740.

Although separate, dedicated wireless connector systems 744, 754 are shown for each computer system 742, 752 in the system of FIG. 7, one or more of the wireless connector systems 744, 754 may preferably be configured to operate in conjunction with more than one computer system 742, 752, or to access a data store or mailbox 719 associated with more than one computer system. For example, the wireless connector system 744 may be granted access to the mailboxes 719 associated with both the computer system 742 and the computer system 752. Requests for data items from either mobile device A 713 or B 715 may then be processed by the wireless connector system 744. This configuration may be useful to enable wireless communications between the LAN 707 and the mobile devices 713 and 715 without requiring a desktop computer system 742, 752 to be running for each mobile device user. A wireless connector system may instead be implemented in conjunction with the message server 720 to enable wireless communications.

Figure 8:
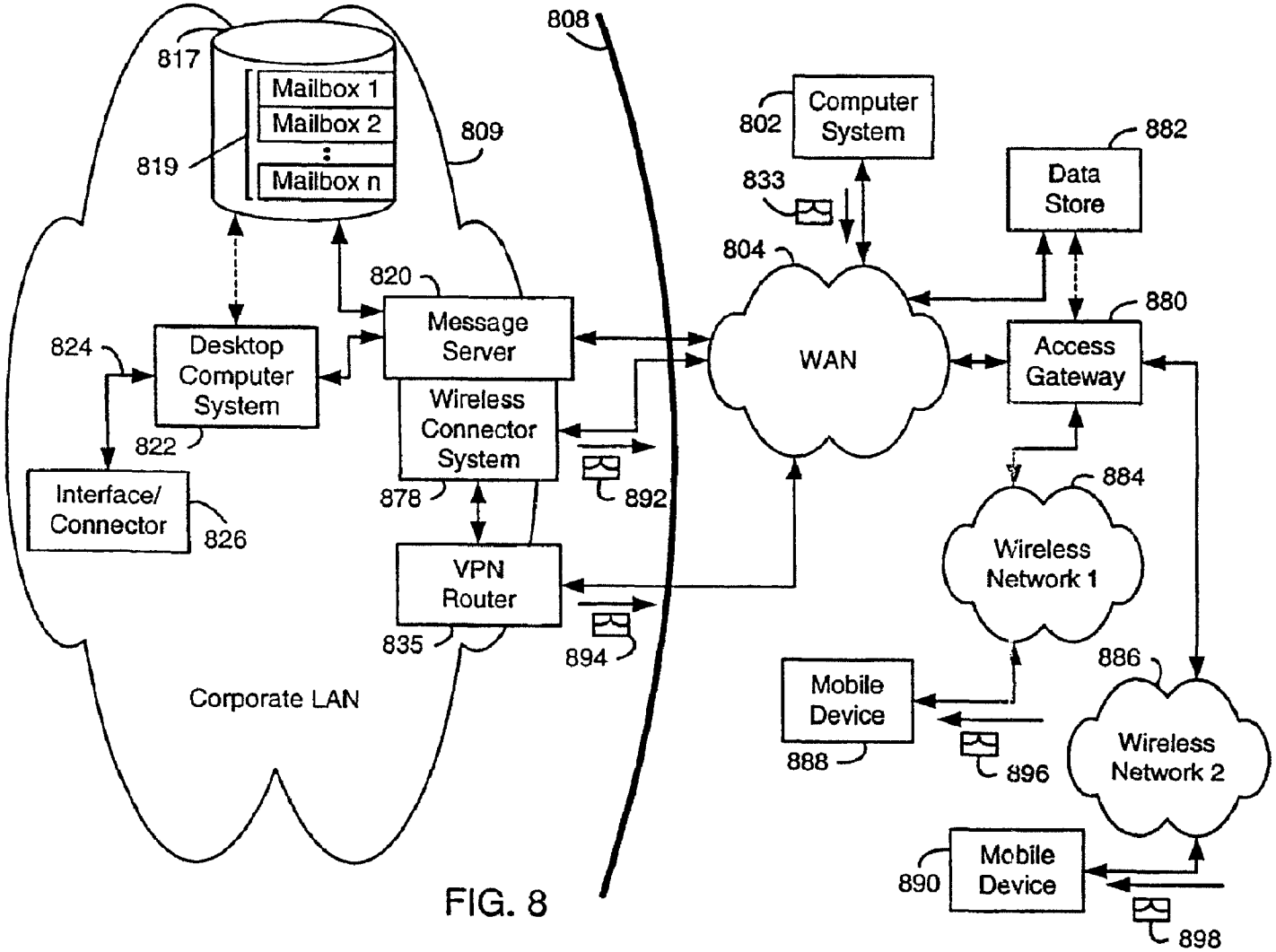
FIG. 8 is a block diagram of another alternative communication system.

FIG. 8 is a block diagram of another alternative communication system. The system includes a computer system 802, WAN 804, a corporate LAN 809 located behind a security firewall 808, an access gateway 880, data store 882, wireless networks 884 and 886, and mobile devices 888 and 890. The LAN 809, the computer system 802, WAN 804, security firewall 808, message server 820, data store 817, mailboxes 819, desktop computer system 822, physical connection 824, interface or connector 826 and VPN router 835 are substantially the same as the corresponding components described above. The access gateway 880 and data store 882 provide mobile devices 88 and 90 with access to data items stored at the LAN 809. In FIG. 8, a wireless connector system 878 operates on or in conjunction with the message server 820, although a wireless connector system may instead operate on or in conjunction with one or more desktop computer systems in the LAN 809.

The wireless connector system 878 provides for transfer of data items stored at the LAN 809 to one or more mobile devices 888, 890. These data items preferably include e-mail messages stored in mailboxes 819 in the data store 817, as well as possibly other items stored in the data store 817 or another network data store or a local data store of a computer system such as 822.

As described above, an e-mail message 833 addressed to one or more recipients having an account on the message server 820 and received by the message server 820 may be stored into the mailbox 819 of each such recipient. In the system of FIG. 8, the external data store 882 preferably has a similar structure to, and remains synchronized with, the data store 817. PIM information or data stored at data store 882 preferably is independently modifiable to the PIM information or data stored at the host system. In this particular configuration, the independently modifiable information at the external data store 882 may maintain synchronization of a plurality of data stores associated with a user (i.e., data on a mobile device, data on a personal computer at home, data at the corporate LAN, etc.). This synchronization may be accomplished, for example, through updates sent to the data store 882 by the wireless connector system 878 at certain time intervals, each time an entry in the data store 817 is added or changed, at certain times of day, or when initiated at the LAN 809, by the message server 820 or a computer system 822, at the data store 882, or possibly by a mobile device 888, 890 through the access gateway 880.

In the case of the e-mail message 833 for example, an update sent to the data store 882 some time after the e-mail message 833 is received may indicate that the message 833 has been stored in a certain mailbox 819 in the store 817, and a copy of the e-mail message will be stored to a corresponding storage area in the data store 882. When the e-mail message 833 has been stored in the mailboxes 819 corresponding to the mobile devices 888 and 890 for example, one or more copies of the e-mail message, indicated at 892 and 894 in FIG. 8, will be sent to and stored in corresponding storage areas or mailboxes in the data store 882. As shown, updates or copies of stored information in the data store 817 may be sent to the data store 882 via a connection to the WAN 804 or the VPN router 835. For example, the wireless connector system 878 may post updates or stored information to a resource in the data store 882 via an HTTP post request. Alternatively, a secure protocol such as HTTPS or Secure Sockets Layer (SSL) may be used. Those skilled in the art will appreciate that a single copy of a data item stored in more than one location in a data store at the LAN 809 may instead be sent to the data store 882. This copy of the data item could then be stored either in more than one corresponding location in the data store 882, or a single copy may be stored in the data store 882, with a pointer or other identifier of the stored data item being stored in each corresponding location in the data store 882.

The access gateway 880 is effectively an access platform, in that it provides mobile devices 888 and 890 with access to the data store 882. The data store 882 may be configured as a resource accessible on the WAN 804, and the access gateway 880 may be an ISP system or WAP gateway through which mobile devices 888 and 890 may connect to the WAN 804. A WAP browser or other browser compatible with the wireless networks 884 and 886 may then be used to access the data store 882, which is synchronized with the data store 817, and download stored data items either automatically or responsive to a request from a mobile device 888, 890. As shown at 896 and 898, copies of the e-mail message 833, which was stored in the data store 817, may be sent to the mobile devices 888 and 890. A data store (not shown) on each mobile device 888, 890 may thereby be synchronized with a portion, such as a mailbox 819, of a data store 817 on a corporate LAN 809. Changes to a mobile device data store may similarly be reflected in the data stores 882 and 817.

It will be appreciated that the above description relates to preferred embodiments by way of example only. Many variations on the invention will be obvious to those knowledgeable in the field, and such obvious variations are within the scope of the invention as described and claimed, whether or not expressly described.

For example, although a wireless mobile communication device is shown in FIGS. 3-5 and described as one of the messaging clients, the invention is also applicable to other messaging clients, including those operating on desktop and laptop computer systems, networked computer workstations and other types of messaging clients between which Cert management and transfer, to allow sharing of Certs for example, is desired.

It is also contemplated that other Cert-related information may be managed and transferred between messaging clients substantially as described above. CRLs, public keys and private keys could similarly be managed and/or transferred.

It is claimed:

1. A method of Certificate (Cert) management and transfer between a computer system having a first data transfer interface and a wireless communication device enabled for communications in a wireless communication network and having a second data transfer interface compatible with the first data transfer interface, the method comprising:

establishing communications between the computer system and the wireless communication device via the first data transfer interface and the second data transfer interface;

checking status of Certs stored at one of the computer system and the wireless communication device;

receiving user input to select one or more Certs from the valid Certs stored at the one of the computer system and the wireless communication device for transfer to the other of the computer system and the wireless communication device; and transferring the selected one or more Certs from the one of the computer system and the wireless communication device to the other of the computer system and the wireless communication device, wherein the transferred one or more Certs are used to handle messages communicated via the wireless communication network that are received from or to be transmitted to one or more remote entities whose communications are associated with the transferred one or more Certs.

2. The method of claim 1, wherein:

establishing communications between the computer system and the wireless communication device comprises establishing a communications link between the first data transfer interface and the second data transfer interface; and the communications link is selected from the group consisting of: a physical communications link and a wireless communications link.

3. The method of claim 1, further comprising:

generating a list of Certs stored at the one of the computer system and the wireless communication device; and displaying the generated list of Certs, wherein the user input comprises a selection of the one or more Certs from the displayed list.

4. The method of claim 3, wherein:

the displaying comprises displaying the generated list on the one of the computer system and the wireless communication device; and the selection of the one or more Certs from the displayed list is made via a user interface associated with the one of the computer system and the wireless communication device.

5. The method of claim 3, wherein:

the displaying comprises displaying the generated list on the other of the computer system and the wireless communication device; and the selection of the one or more Certs from the displayed list is made via a user interface associated with the other of the computer system and the wireless communication device.

6. The method of claim 3, wherein generating the list of Certs comprises:

identifying Certs that are stored at the one of the computer system and the wireless communication device;

identifying Certs that are stored at the other of the computer system and the wireless communication device; and generating a list of Certs that are stored only at the one of the computer system and the wireless communication device and not at the other of the computer system and the wireless communication device.

7. The method of claim 1, further comprising storing the selected one or more Certs in a data store on the other of the computer system and the wireless communication device.

8. The method of claim 1, further comprising:

receiving user input to select one or more Certs stored at the other of the computer system and the wireless communication device for transfer to the one of the computer system and the wireless communication device; and transferring the selected one or more Certs stored at the other of the computer system and the wireless communication device from the other of the computer system and the wireless communication device to the one of the computer system and the wireless communication device.

9. The method of claim 8, further comprising:

generating a list of Certs stored at the one of the computer system and the wireless communication device;

displaying the generated list of Certs on the one of the computer system and the wireless communication device;

generating a list of Certs stored at the other of the computer system and the wireless communication device; and displaying the generated list of Certs on the one of the computer system and the wireless communication device, wherein the user input to select the one or more Certs stored at the one of the computer system and the wireless communication device comprises a selection from the list of Certs stored at the one of the computer system and the wireless communication device and made via a user interface associated with the one of the computer system and the wireless communication device, and wherein the user input to select the one or more Certs stored at the other of the computer system and the wireless communication device comprises a selection from the list of Certs stored at the other of the computer system and the wireless communication device and made via a user interface associated with the one of the computer system and the wireless communication device.

10. The method of claim 1, further comprising:

generating a list of Certs stored in a data store at the other of the computer system and the wireless communication device;

displaying the generated list of Certs on the one of the computer system and the wireless communication device;

receiving user input to select for deletion from the data store one or more Certs from the displayed list via a user interface associated with the one of the computer system and the wireless communication device; and deleting the selected one or more Certs from the data store on the other of the computer system and the wireless communication device.

11. The method of claim 1, wherein the computer system is selected from the group consisting of: a desktop computer system, a laptop computer system, and a wireless mobile communication device.

12. The method of claim 1, wherein the one or more Certs associated with the one or more remote entities are available from a third-party certificate authority.

13. A system for Certificate (Cert) management and transfer between a computer system and a wireless communication device, the system comprising:

at the computer system:

a first memory comprising a first Cert store configured to store Certs;

a first Cert synchronization (sync) system configured to access the first Cert store; and a first communications interface; and at the wireless communication device:

a second memory comprising a second Cert store configured to store Certs;

a second Cert sync system configured to access the second Cert store;

a wireless transceiver that enables the wireless communication device for communications in a wireless communication network; and a second communications interface compatible with the first communications interface, wherein the first Cert sync system is further configured to transfer Certs stored in the first Cert store from the computer system to the wireless communication device when a communications link is established between the computer system and the wireless communication device via the first communications interface and the second communications interfaces, wherein the first Cert sync system checks status of the Certs stored in the first Cert store to ensure that valid Certs are transferred to the wireless communication device; and wherein the transferred Certs are used to handle messages communicated via the wireless communication network that are received from or to be transmitted to remote entities whose communications are associated with the transferred Certs.

14. The system of claim 13, wherein the second Cert sync system is further configured to store Certs transferred from the computer system to the wireless communication device to the second Cert store.

15. The system of claim 14, further comprising a user interface at the computer system, the user interface being configured to accept user inputs to select one or more of the Certs stored in the first Cert store, wherein the selected Certs are transferred from the computer system to the wireless communication device.

16. The system of claim 15, wherein the second Cert sync system is further configured to transfer Certs stored in the second Cert store from the wireless communication device to the computer system when the communications link is established between the computer system and the wireless communication device via the first communications interface and the second communications interface.

17. The system of claim 14, wherein the user interface at the computer system is further configured to accept user inputs to select one or more of the Certs stored in the second Cert store, wherein the selected one or more Certs are transferred from the wireless communication device to the computer system.

18. The system of claim 13, wherein the first Cert sync system is further configured to check the status of each Cert stored in the second Cert store to detect expired, invalid or revoked Certs stored in the second Cert store.

19. The system of claim 13, wherein the computer system is selected from the group consisting of: a desktop computer system, a laptop computer system, and a wireless mobile communication device.

20. The system of claim 13, wherein the wireless communication device is selected from the group consisting of: a data communication device, a voice communication device, a dual-mode communication device having both data and voice communications functionality, a cellular telephone having data communications functionality, a personal digital assistant (PDA) enabled for wireless communications, and a laptop or desktop computer system with a wireless modem.

21. The system of claim 13, further comprising:

at the computer system:

a first messaging system; and a first communications subsystem; and at the wireless communication device:

a second messaging system; and a second communications subsystem, wherein the first messaging system is configured to store Certs received via the first communications subsystem to the first Cert store and the second messaging system is configured to store Certs received via the second communications subsystem to the second Cert store.

22. The system of claim 13, wherein the first communications interface and the second communications interface establish a physical link between the computer system and the wireless communication device.

23. The system of claim 22, wherein the first communications interface and the second communications interface are selected from the group consisting of: serial ports and Universal Serial Bus (USB) ports.

24. The system of claim 22, wherein the first communications interface and the second communications interface are selected from the group consisting of: Infrared Data Association (IrDA) ports, Bluetooth modules and 802.11 modules.

25. The system of claim 13, wherein the first communications interface and the second communications interface establish a wireless link between the computer system and the wireless communication device.

26. A system for transferring Certificates (Certs) between a computer system and a wireless mobile communication device, the system comprising:

a serial port associated with the computer system;

a mobile device connector connected to the serial port, the mobile device connector having an interface; and a mobile device interface associated with the wireless mobile communication device and compatible with the interface of the mobile device connector, wherein Certs stored at the computer system are transferred to the wireless mobile communication device when a communications link is established between the computer system and the wireless mobile communication device by placing the wireless mobile communication device in the mobile device connector, wherein status of the Certs stored at the computer system is checked to ensure that valid Cells are transferred to the wireless mobile communication device; and wherein the transferred Certs are used to handle messages communicated via the wireless communication network that are received from or to be transmitted to remote entities whose communications are associated with the transferred Certs.

27. A wireless mobile communication device comprising:

a wireless transceiver;

a messaging system coupled to the wireless transceiver;

a communications interface for exchanging data with a computer system;

a Cert store configured to store Certificates (Certs); and a Cert synchronization (sync) system coupled to the Cert store and the communications interface, wherein the messaging system is configured to store Certs received via the wireless transceiver to the Cert store, and the Cert sync system is configured to store Certs received from the computer system via the communications interface to the Cert store, wherein status of the received Certs is checked at the computer system to ensure valid Certs are sent to the wireless mobile communication device; and wherein the stored Certs are used to handle messages communicated via the wireless communication network that are received from or to be transmitted to remote entities whose communications are associated with the stored Certs.

28. The wireless mobile communication device of claim 27, wherein the messaging system is further configured to request Certs from a Public Key Server (PKS).

29. The wireless mobile communication device of claim 27, wherein the communications interface is selected from the group consisting of: a serial port, a Universal Serial Bus (USB) port, and Infrared Data Association (IrDA) port, a Bluetooth module and an 802.11 module.

30. The wireless mobile communication device of claim 27, wherein the wireless mobile communication device is selected from the group consisting of: a data communication device, a voice communication device, a dual-mode communication device having both data and voice communications functionality, a cellular telephone having data communications functionality, a personal digital assistant (PDA) enabled for wireless communications, and a laptop or desktop computer system with a wireless modem.

* * * * *